(12) United States Patent
Cheng et al.

(10) Patent No.: US 6,970,841 B1
(45) Date of Patent: Nov. 29, 2005

(54) LARGE INVENTORY-SERVICE OPTIMIZATION IN CONFIGURE-TO-ORDER SYSTEMS

(75) Inventors: Feng Cheng, Chappaqua, NY (US); Markus Ettl, Yorktown Heights, NY (US); Grace Yuh-Jiun Lin, Chappaqua, NY (US); David Da-Wel Yao, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,118

(22) Filed: Apr. 17, 2000

(51) Int. Cl.$^7$ ............................................. G06F 17/60
(52) U.S. Cl. ...................................... 705/28; 705/22
(58) Field of Search ........................... 705/28, 29, 10, 705/22, 26, 27

(56) References Cited

U.S. PATENT DOCUMENTS

| | | | | |
|---|---|---|---|---|
| 5,237,495 | A | * | 8/1993 | Morii ............................. 705/8 |
| 5,287,267 | A | * | 2/1994 | Jayaraman et al. ........... 705/10 |
| 5,515,269 | A | * | 5/1996 | Willis et al. ................... 705/29 |
| 5,963,919 | A | * | 10/1999 | Brinkley et al. ............... 705/28 |
| 6,078,850 | A | * | 6/2000 | Kane et al. .................... 701/29 |
| 6,151,582 | A | * | 11/2000 | Huang et al. ................... 705/8 |
| 6,321,132 | B1 | * | 11/2001 | Dawande et al. ............. 705/28 |
| 6,377,953 | B1 | * | 4/2002 | Gawlick et al. ............ 707/102 |
| 6,516,301 | B1 | * | 2/2003 | Aykin ........................... 705/10 |
| 6,611,726 | B1 | * | 8/2003 | Crosswhite ................... 700/99 |
| 6,816,839 | B1 | * | 11/2004 | Gung et al. .................... 705/10 |

FOREIGN PATENT DOCUMENTS

| | | | | |
|---|---|---|---|---|
| JP | 2004227269 | A | * | 8/2004 |

OTHER PUBLICATIONS

J.M. Swaminathan et al., "Stochastic Programming Models for Managing Product Variety", in *Quantitative Models for Supply Chain Management*, S. Tayur, R. Ganeshan and M. Magazine (eds.), Kluwer Academic Publishers, Norwell, 1999, pp. 585-624.

Y. Aviv et al., "The Benefits of Design for Postponement", in *Quantitative Models for Supply Chain Managment*, S. Tayur, R. Ganeshan and M. Magazine (eds.), Kluwer Academic Publishers, Norwell, 1999, pp. 553-584.

A. Garg, et al., "Managing Product Variety: An Opertaions Perspective", in *Quantitative Models for Supply Chain Management*, S. Tayur, R. Ganeshan and M. Magazine (eds.), Kluwer Academic Publishers, Norwell, 1999, pp. 467-490.

L. Li, "The Role of Inventory in Delivery-Time Competition", Management Science, 38 (1992), 182-197.

(Continued)

*Primary Examiner*—Bryan Jaketic
*Assistant Examiner*—Ronald Laneau
(74) *Attorney, Agent, or Firm*—Whitham, Curtis & Christofferson, P.C.; Stephen C. Kaufman

(57) ABSTRACT

A manufacturing process is migrated from an existing operation to a configure-to-order (CTO) system. As the CTO operation will eliminate the "machine-type model" (MTM) inventory of the existing operation, the emphasis is shifted to the components, or "building blocks", which will still follow the build-to-stock scheme, due to their long lead-times, and hence still require inventory. The solution involves an inventory-service trade-off of the new CTO system, resulting in performance gains, in terms of reduced inventory cost and increased service level. Other benefits include better forecast accuracy through parts commonality and risk-pooling, and increased customer demand, as orders will no longer be confined within a restricted set of pre-configured MTMs.

9 Claims, 9 Drawing Sheets

OTHER PUBLICATIONS

S. Mahajan et al., "Retail Inventories and Consumer Choice", in *Quantitative Models for Supply Chain Management*, S. Tayur, R. Ganeshan and M. Magazine (eds.), Kluwer Academic Publishers, Norwell, 1999, pp. 491-552.

J. Song, et al, "Order-Fulfillment Performance Measures in an Assemble-to-Order System with Stochastic Leadtimes", Operations Research, vol. 47, No. 1, Jan.-Feb. 1999, pp. 131-149.

P. Glasserman, "Leadtime-Inventory Trade-Offs in Assembnle-to-Order Systems", Operations Research, vol. 46, No. 6, Nov.-Dec. 1998, pp. 858-871.

J. Song, "On the Order Fill Rate in a Multi-Item, Base-Stock Inventory System", Operations Research, vol. 46, No. 6, Nov.-Dec. 1998, pp. 831-845.

D. Connors, et al., "Methods for Configuration in Semiconductor Manufacturing", IEEE Transactions on Semiconductor Manufacturing, vol. 9, No. 3, Aug. 1996.

S. Ross, "Stochastic Processes", Sheldon M. Ross, $2^{nd}$ ed., 1996.

* cited by examiner

LARGE INVENTORY-SERVICE OPTIMIZATION IN CONFIGURE-TO-ORDER SYSTEMS

BACKGROUND OF THE INVENTION

1. Field of the Invention

The present invention generally relates to computer assisted manufacturing processes and, more particularly, to a model for re-engineering a build-to-stock operation to a configure-to-order operation centered around "building blocks", thereby keeping inventory only at the component level.

2. Background Description

A configure-to-order (CTO) system is a hybrid of make-to-stock and make-to-order operations: a set of components (subassemblies) are built to stock whereas the end products are assembled to order. This hybrid model is most suitable in an environment where the time it takes to assemble the end product is negligible, while the production/replenishment leadtime for each component is much more substantial. Personal Computer (PC) manufacturing is a good example of such an environment. By keeping inventory at the component level, customer orders can be filled quickly. On the other hand, postponing the final assembly until order arrival provides a high level of flexibility in terms of product variety, and also achieves resource pooling in terms of maximizing the usage of component inventory. Therefore, the CTO system appears to be an ideal business process model that provides both mass customization and a quick response time to order fulfillment.

Such a hybrid model is often referred to as an assemble-to-order (ATO) system in the research literature. In an ATO system, usually there is a pre-fixed set of end-product types from which customers must choose. In contrast, a CTO system takes the ATO concept one step further, in allowing each customer to configure his/her own product in terms of selecting a personalized set of components that go into the product. Aside from checking that the product so configured must "make sense", there is no "menu" of product types that limits the customer's choice.

PC manufacturing traditionally has been a build-to-plan (or build-to-forecast) process, a process that is sometimes referred to as the "machine-type model" (MTM) operation. There is a set of end products, or MTMs. Demand forecasts over a future planning horizon are generated for each MTM, and updated periodically for each planning cycle, typically, a weekly cycle. A "materials requirements planning" (MRP) type explosion technique is then used to determine the requirements for the components over the planning horizon, based on the bill-of-materials (BOM) structure of each end product. Because of the random variation involved in demand forecasts, safety stock is usually kept for each end product, as well as at each component level, in order to meet a desirable customer service level. However, holding finished goods inventory for any length of time is very costly in the PC business, where product life cycle is measured in months and price reduction takes place almost every other week.

Y. Wang, "Service Levels in Production-Inventory Networks: Bottlenecks, Tradeoffs, and Optimization", Ph.D. Dissertation, Columbia University, 1988, applies an asymptotic result in an optimization problem to minimize average inventory holding cost with a constraint on the order fill-rate. J. M. Swaminathan and S. R. Tayur, "Stochastic Programming Models for Managing Product Variety", in *Quantitative Models for Supply Chain Management*, S. Tayur, R. Ganeshan and M. Magazine (eds.), Kluwer Academic Publishers, Norwell, 1999, pp. 585–624, use stochastic programming models to study three different strategies at the assembly stage; utilizing component commonality, postponement (the "vanilla box approach"), and integrating assembly task design and operations. Other related recent works, not necessarily in the CTO setting, include Y. Aviv and A. Federgruen, "The Benefits of Design for Postponement", in *Quantitative Models for Supply Chain Management*, S. Tayur, R. Ganeshan and M. Magazine (eds.), Kluwer Academic Publishers, Norwell, 1999, pp. 553–584, A. Garg and H. L. Lee, "Managing Product Variety: An Operations Perspective", in *Quantitative Models for Supply Chain Management*, S. Tayur, R. Ganeshan and M. Magazine (eds.), Kluwer Academic Publishers, Norwell, 1999, 467–490, L. Li, "The Role of Inventory in Delivery-Time Competition", *Management Science*, 38 (1992), 182–197, and S. Mahajan and G. J. van Ryzin, "Retail Inventories and Consumer Choice", in *Quantitative Models for Supply Chain Management*, S. Tayur, R. Ganeshan and M. Magazine (eds.), Kluwer Academic Publishers, Norwell, 1999, 491–552.

SUMMARY OF THE INVENTION

The problem solved by the present invention is to migrate a manufacturing process from an existing operation to a Web-based CTO operation where customer orders will be taken from the Internet. As the CTO operation will eliminate the MTM inventory, the emphasis will be shifted to the components, or "building blocks", which will still follow the build-to-plan scheme, due to their long leadtimes, and hence still require inventory. The solution involves an inventory-service trade-off of the new CTO system, with resulting performance gains, in terms of reduced inventory cost and increased service level. There are other benefits: There will be better forecast accuracy through parts commonality and risk-pooling. Customer demand is expected to increase, as orders will no longer be confined within a restricted set of pre-configured MTMs.

Whereas most studies in the literature focus on certain segments of the supply chain, modeled as simple stand-alone queues, the present invention aims at modeling large-scale, end-to-end enterprise supply chains, such as those in the PC industry. The centerpiece of the invention is a network of inventory queues, which integrates inventory control with the delay-capacity features of queues. The network configuration is determined by the bill of materials (BOM) structure of the end products. The solution approach is a decomposition-based approximation, coupled with non-linear optimization using conjugate gradient search. The model can be used not only to study the inventory-service tradeoff, but also to compare the effects on inventory and service performances through changing the network configuration; i.e., the supply chain structure, and to identify the best configuration.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

We consider a hybrid model, by which each end product is configured to order from a set of components, which, in turn, are built to stock. In other words, no finished goods inventory is kept for any end product, whereas each component ("building block") has its own inventory, replenished from a supplier following a base-stock policy.

Figure 1:
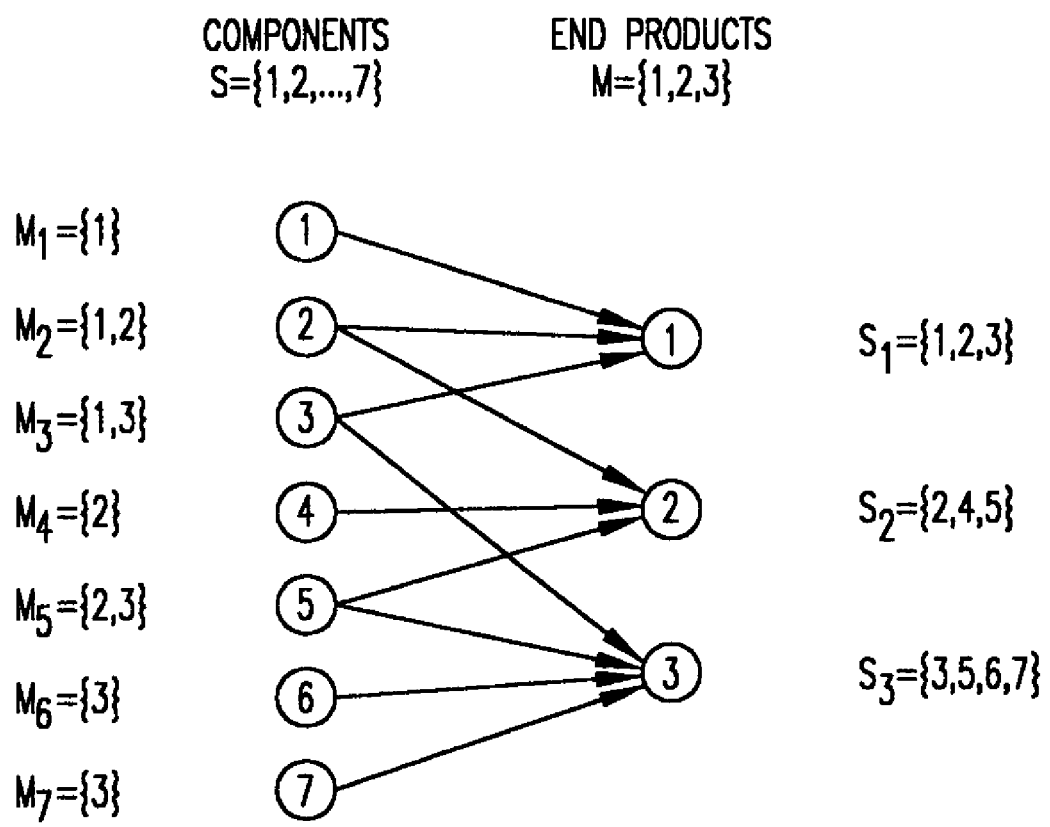
FIG. 1 is a diagram illustrating an example of a bill-of-material structure of seven components used to produce three end products in an configure-to-order system.

Referring now to the drawings, and more particularly to FIG. 1, there is shown a diagram illustrating an example of this hybrid model. Abstractly, there are seven components comprising the set $S=\{1, 2, \ldots, 7\}$ which are used in various combinations to produce three end products comprising the set $M=\{1, 2, 3\}$. The components are maintained in inventory, but no inventory is maintained of end products. Each component inventory is indexed by $i$, $i \in S$, where $S$ denotes the set of all components. Associated with each component is a "store", where the inventory is kept.

ATO Environment

First, consider the traditional ATO environment. That is, there is a pre-specified set of end products (i.e., machine type models), with each type indexed by $m \in M$ where $M$ denotes the set of all product types. For each product type, there is a corresponding demand stream.

Time is discrete, indexed by t, with each time unit called a period. Let $D_m(t)$ denote the demand of type m in period t. Each unit of type m demand requires a subset of components, denoted $S_m \subseteq S$, possibly with multiple units of each component. From the BOM structure of the end product, we can identify $M_i$ as the subset of end products that all require component T as part of the assembly. That is, $M_i = \{m: i \in S_m\}$.

There are two kinds of leadtimes; those associated with the components, and those associated with the end-products:

$L_i^{in}$, $i \in S$: the in-bound leadtime—the time for the supplier of component i to replenish to store i once an order is placed. Assume this leadtime is known through a given distribution. For instance, a normal distribution with mean and variance given.

$L_i^{out}$, $m \in M$: the out-bound leadtime—the time to supply a customer demand of type m, provided there is no stockout of any component $i \in S_m$. This time includes the order processing time, the assembly/reconfiguration time, and the transportation time to deliver the order. The distribution of this leadtime is also assumed known.

We can now express the demand at store i in period t, for any $i \in S$ and any $t=1, 2, \ldots$, as follows:

$$D_i(t) = \sum_{m \in M_i} D_m(t + L_m^{out}).$$

Note this is the standard MRP type of demand-leadtime offset. We derive the mean and variance for $D_i(t)$ as follows:

$$E[D_i(t)] = \sum_{m \in M_i} \sum_l E[D_m(t+l)] P[L_m^{out} = l], \quad (1)$$

$$Var[D_i(t)] = \quad (2)$$
$$\sum_{m \in M_i} \sum_l E[D_m^2(t+l)] P[L_m^{out} = l] - \sum_{m \in M_i} \left( \sum_l E[D_m(t+l)] P[L_m^{out} = l] \right)^2$$

The variance calculation above assumes independence among demand classes; for correlated demands, simply add to the above the covariance terms.

CTO Environment

The above analysis is now adapted to the CTO environment. In this environment, there is no pre-specified product menu; in principle, every order can require a distinct set of components. Hence, we use M to denote the set of product/demand families that use the same set of components S. For instance, M={low-end machines, high-end machines, servers}; or M={individuals, small business, corporations}.

Suppose $D_m$ is the demand associated with product family m in a certain period (for simplicity, the time argument t is omitted). Suppose each unit (order) in $D_m$ requires a random number of units from component i, denoted as $X_{mi}$, which takes on non-negative integer values. The sets M and $M_i$ are still defined as before, but they now take on the following form:

$$S_m = S - \{i : X_{mi} = 0\}, \text{ and } M_i = M - \{m : X_{mi} = 0\}$$

We can then translate the end-product demand into demand for each component i (per period).

$$D_i = \sum_{m \in M_i} \sum_{k=1}^{D_m} X_{mi}(k).$$

where $X_{mi}(k)$, for $k=1, 2, \ldots$, are independent, identically distributed (i.i.d.) copies of $X_{mi}$. Assume the mean and the variance of $X_{mi}$ are known. For instance, starting from the joint distribution of $(X_{mi})_{i \in S_m}$, derived from empirical demand data, we can derive the marginal distributions, and then the mean and the variance of $X_{mi}$. Applying Wald's identity (S. M. Ross, *Stochastic Processes*, John Wiley & Sons, New York, 1996), we can derive:

$$E[D_i] = \sum_{m \in M_i} E[X_{mi}] E[D_m], \quad (3)$$

-continued $$Var[D_i] = \sum_{m \in M_i} (E[D_m]Var[X_{mi}] + Var[D_m]E^2[X_{mi}]) \quad (4)$$
$$= \sum_{m \in M_i} (E^2[X_{mi}]E[D_m^2] + Var[X_{mi}]E[D_m] - E^2[X_{mi}]E^2[D_m])$$

Therefore, equations (1) and (2) can be generalized as follows:

$$E[D_i(t)] = \sum_{m \in M_i} E[X_{mi}] \sum_l E[D_m(t+l)]P[L_m^{out} = l], \quad (5)$$

$$Var[D_i(t)] = \sum_{m \in M_i} E^2(X_{mi}) \sum_l E[D_m^2(t+l)]P[L_m^{out} = l] + \quad (6)$$
$$\sum_{m \in M_i} Var[X_{mi}] \sum_l E[D_m(t+l)]P[L_m^{out} = l] -$$
$$\sum_{m \in M_i} E^2(X_{mi}) \left( \sum_l E[D_m(t+l)]P[L_m^{out} = l] \right)^2.$$

Base-Stock Control

As mentioned above, suppose each store i follows a base-stock policy. Let $R_i(t)$ denote the reorder point (or, base-stock level) in period t. Express the reorder point as follows:

$$R_i(t) := \mu_i(t) + k_i(t)\sigma_i(t) \quad (7)$$

where $k_i(t)$ is the desired safety factor, while $\mu_i(t)$ and $\sigma_i(t)$ can be derived (via queuing analysis as follows:

$$\mu_i(t) = \sum_{s=t}^{t+l_i^{in}-1} E[D_i(s)], \quad (8)$$

$$\sigma_i^2(t) = \sum_{s=t}^{t+l_i^{in}-1} Var[D_i(s)], \quad (9)$$

where $l_i^{in} := E[L_i^{in}]$ is the expected in-bound leadtime, and $E[D_i(s)]$ and $Var[D_i(s)]$ follow equations (1) and (2), respectively. Note that since time is discrete, we shall round up any real-valued $l_i^{in}$ to the next integer to be used in equations (8) and (9). Also note that the reason we choose to write $R_i(t)$ as in equation (7) is because we model the demand as follows:

$$D_i(t) = \mu_i(t) + \sigma_i(t) \cdot Z, \quad (10)$$

where Z denotes the standard normal variate.

To facilitate implementation, it is often desirable to translate $R_i(t)$ into "days of supply" (DOS), or more precisely, periods of supply. To do so, note that the $\mu_i(t)$ part of $R_i(t)$ simply translates into periods of demand. In addition, we can turn the $k_i(t)\sigma_i(t)$ part of $R_i(t)$ into $$\frac{k_i(t)\sigma_i(t)}{\frac{\mu_i(t)}{l_i^{in}}}$$

periods of demand. Hence, we can express $R_i(t)$ in terms of periods of demand, or DOS, as follows:

$$DOS_i(t) = l_i^{in}\left[1 + k_i(t)\frac{\sigma_i(t)}{\mu_i(t)}\right] \quad (11)$$

Note the intuitively appealing form of equation (11), in particular the safety-stock (or rather, safety time) part, which is equal to the product of the safety factor and the coefficient of variation (i.e., the ratio of standard deviation to mean) of the component demand over the (in-bound) leadtime.

For the inventory performance measures, the expected on-hand inventory and back-order level are as follows:

$$E[I_i(t)] = \sigma_i(t)H(k_i(t)), E[B_i(t)] = \sigma_i(t)G(k_i(t)). \quad (12)$$

Here the function $G(\bullet)$ is defined as:

$$G(x) := E[Z-x]^+ = \int_x^\infty (z-x)\phi(z)dz = \phi(x) - x\bar{\Phi}(x), \quad (13)$$

with Z denoting the standard normal variate, $\phi$ and $\Phi$ denoting, respectively, the density function and the distribution function of Z, and $\bar{\Phi} := 1 - \Phi(x)$. The function $H(\bullet)$ is defined as:

$$H(x) := E[x-Z]^+ x + G(x) = \phi(x) + x\Phi(x). \quad (14)$$

Note that the expressions in (12) are based on the following identities:

$$I_i(t) = [R_i(t) - D_i(t)]^+, \text{ and } B_i(t) = [D_i(t) - R_i(t)]^+;$$

along with equations (7) and (10). Furthermore, we have $$P[D_i(t) \geq R_i(t)] = P[Z \geq k_i(t)] = \bar{\Phi}(k_i(t)), \quad (15)$$

which relates to the service requirement to be elaborated in the next section.

Next, suppose demand is stationary, i.e., for each demand class m, $D_m(t)$ is invariant in distribution over time. Then, the mean and the variance of demand per period for each component i follow the expressions in (3) and (4). Consequently, (8) and (9) reduce to the following $$\mu_i = l_i^{in}E[D_i], \text{ and } \sigma_i^2 = l_i^{in}Var[D_i]. \quad (16)$$

We can then write $$R_i = l_i^{in}E[D_i] + k_i\sqrt{l_i^{in}} sd[D_i]; \quad (17)$$

and hence, $$DOS_i = \frac{R_i}{E[D_i]} = l_i^{in} + k_i \theta_i \sqrt{l_i^{in}} = l_i^{in}\left[1 + k_i \frac{\theta_i}{\sqrt{l_i^{in}}}\right], \quad (18)$$

where $\theta_i$:sd$[D_i]$/$E[D_i]$ is the coefficient of variation of the demand per period for component i. (Hence, $$\theta_i / \sqrt{l_i^{in}}$$

is the coefficient of variation of the demand over the leadtime $l_i^{in}$ which is consistent with the general formula in equation (11).)

Sometimes it is more appropriate to adjust the demand distribution to account for non-negativity. Specifically, instead of $D = \mu + \sigma Z$, where Z is the standard normal variate, we should have $\tilde{D} = [\mu + \sigma Z]^+$. The adjusted mean follows from equation (13) as follows:

$$E[\tilde{D}] = \sigma E\left[Z - \left(-\frac{\mu}{\sigma}\right)\right]^+ = \sigma G\left(-\frac{\mu}{\sigma}\right). \quad (19)$$

To derive the adjusted variance, note the following:

$$E\{[(Z-x)^+]^2\} = \int_x^\infty (z-x)^2 \phi(z)\,dz$$
$$= x\phi(x) + \bar{\Phi}(x) - 2x\phi(x) + x^2 \bar{\Phi}(x)$$
$$= \bar{\Phi}(x) - xG(x),$$

where the last equation makes use of equation (13). Hence, $$\text{Var}[\tilde{D}] = \sigma^2 \text{Var}\left\{\left[Z - \left(-\frac{\mu}{\sigma}\right)\right]^+\right\} \quad (20)$$
$$= \sigma^2 E\left\{\left[\left(Z - \left(-\frac{\mu}{\sigma}\right)\right)^+\right]^2\right\} - [E(\tilde{D})]^2$$
$$= \sigma^2\left[\bar{\Phi}\left(-\frac{\mu}{\sigma}\right) + \frac{\mu}{\sigma}G\left(-\frac{\mu}{\sigma}\right) - G^2\left(-\frac{\mu}{\sigma}\right)\right].$$

For moderately large x (say, $x \geq 2$), from equation (13), we have $G(-x) \cong x$, and hence $E[\tilde{D}] \cong E[D], \text{Var}[\tilde{D}] \cong \text{Var}[D],$ from equations (19) and (20). Therefore, the above adjustment is only needed when the coefficient of variation of the demand, $\sigma/\mu$, is relatively large, say, 0.5 or above.

From equations (7), (17) and (18), it is clear that to identify the base-stock policy is tantamount to specifying the safety factor $k_i$ for each component inventory. In the following sections, we discuss how to set the safety factor values so as to achieve the best inventory-service performance as specified in the optimization problems below.

For ease of exposition, we shall focus on stationary demand. For non-stationary demand, we can simply solve the optimization problems below period by period.

Service Requirement

To start with, consider the special case of each order of type m requires exactly one unit of component $i \in S_m$. Let $\alpha$ be the required service level, defined here as the off-shelf availability of all the components required to configure a unit of type m product, for any m. Let $E_i$ denote the event that component i is out of stock. Then, we require, for each end product $m \in M$, $$P[\cup_{i \in S_m} E_i] \leq 1 - \alpha.$$

From the well-known inclusion-exclusion formula:

$$P\left[\bigcup_{i \in S_m} E_i\right] = \sum_i P(E_i) - \sum_{i<j} P(E_i \cap E_j) + \sum_{i<j<k} P(E_i \cap E_j \cap E_k) - \ldots,$$

we have, as an approximation, $$P[\cup_{i \in S_m}] \cong \sum_{i \in S_m} P(E_i) = \sum_{i \in S_m} \bar{\Phi}(k_i) \leq 1 - \alpha. \quad (21)$$

There is another way to arrive at the above inequality. Suppose we express the service requirement as follows:

$$\prod_{i \in S_m} \Phi(k_i) \geq \alpha, \quad m \in M. \quad (22)$$

Note that the left hand side in inequality (22) is, in fact, a lower bound of the no-stockout probability of the set of components in $S_m$ that is required to configure the end-product m; i.e., it is a lower bound of the desired off-shelf availability. This claim (of a lower bound) can be argued by using stochastic comparison techniques involving the notion of association. (Refer to, e.g., S. M. Ross, *Stochastic Processes*, $2^{nd}$ ed., Wiley, New York (1998), for background materials.) Intuitively, since the component inventories are driven by a common demand stream $\{D_m(t)\}$, and hence positively correlated, the chance of missing one or several components must be less than when the component inventories are independent, which is what is assumed by the product on the left hand side of inequality (22).

Since $$\prod_{i \in S_m} \Phi(k_i) = \prod_{i \in S_m} [1 - \bar{\Phi}(k_i)] \cong 1 - \sum_{i \in S_m} \bar{\Phi}(k_i),$$

combining the above and inequality (22), we arrive at the same inequality in (21).

In the general setting of CTO, consider demand of product family m. Let $A \subseteq S_m$ denote a certain configuration, which occurs in this demand stream with probability $P(A)$. Then the no-stockout probability, $\prod_{i \in A} \Phi(k_i)$, should be weighted by $P(A)$. Hence, the service requirement in (22) should be changed to $$\alpha \leq \sum_{A \subseteq S_m} P(A) \prod_{i \in A} \Phi(k_i)$$

$$\approx \sum_{A \subseteq S_m} P(A) \left[1 - \sum_{i \in A} \overline{\Phi}(k_i)\right]$$

$$= 1 - \sum_{A \subseteq S_m} P(A) \sum_{i \in A} \overline{\Phi}(k_i)$$

$$= -1 - \sum_{i \in S_m} \left(\sum_{i \in A} P(A)\right) \overline{\Phi}(k_i).$$

Since $$\sum_{i \in A} P(A) = P(X_{mi} > 0) := r_{mi}, \quad (23)$$

in the CTO environment the service requirement in (21) can be extended to the following:

$$\sum_{i \in S_m} r_{mi} \overline{\Phi}(k_i) \leq 1 - \alpha, \quad (24)$$

where $r_{mi}$ follows (23).

Note that in the CTO environment, in particular when $X_{mi} \geq 1$, the stockout at component i should occur more often than $\overline{\Phi}(k_i)$ due to the batch size associated with each order. In particular, (15) should be modified as follows (omitting the time argument t):

$$P[D_i + X_{mi} \geq R_i] = P\left[Z \geq k_i - \frac{X_{mi}}{\sigma_i}\right] = \overline{\Phi}\left(k_i - \frac{X_{mi}}{\sigma_i}\right),$$

which is larger than $\overline{\Phi}(k_i)$. But this gap should be insignificant, since $$\frac{X_{mi}}{\sigma_i} = \frac{X_{mi}}{\theta_i \mu_i},$$

where $\theta_i := \sigma_i/\mu_i$ is the coefficient of variation (or, forecast error); and the batch size of incoming orders is usually orders of magnitude smaller when compared against $\mu_i$, which is the mean of demand summed over all product types $m \in M_i$ and over the leadtime. Also note that this underestimation of the stockout probability is compensated by the overestimation involved in (22), since the latter is a lower bound of the no-stockout probability.

We can now relate the above off-shelf availability requirement to the standard customer service requirements expressed in terms of leadtimes, $W_m$. Suppose the required service level of type m demand is:

$$P[W_m \geq w_m] \geq \alpha, m \in M, \quad (25)$$

where $w_m$'s are given data.

Consider type m demand. We have the following two cases:
  (i) When there is no stockout at any store $i \in S_m$—denoting the associated probability as $\pi_{0m}(t)$, the delay is simply $L_i^{out}$, the out-bound leadtime.
  (ii) Suppose there is a stockout at one or several stores in the subset $s \subseteq S_m$. Denote the associated probability as $\pi s_m(t)$. Then, the delay becomes $L_i^{out} + \tau_s$, where $\tau_s$ is the additional delay before the missing components in s become available.

Hence, we can write $$P[W_m \leq w_m] = \pi_{0m}(t) P[L_m^{out} \leq w_m] + \sum_{s \in S_m} \pi_{sm}(t) P[L_m^{out} + \tau_s \leq w_m]. \quad (26)$$

In most applications, it is reasonable to assume that $$L_m^{out} \leq w_m \text{ and } L_m^{out} + \tau_s > w_m \quad (27)$$

both hold almost surely. For instance, this is the case when the (nominal) outbound leadtime is nearly deterministic and shorter than what the customers require (this is, after all, a precondition for-running an configure-to-order operation); whereas the replenish leadtime for any component is substantially longer, hence it is virtually impossible to meet the customer service requirement in the case of any component stockout.

Clearly, with the assumed inequalities in (27), the first probability on the right hand side of (26) becomes one, and the probabilities under the summation all become zero. Consequently, the leadtime service requirement in (25) reduces to the off-shelf availability $\pi_{0m}$, and a lower bound of the latter is the left hand side of (22), as we explained earlier.

Inventory-Service Optimization

Our objective is to minimize the maximum stockout probability among all end-products subject to a given inventory budget. In view of equation (21) and the more general service contraint in (24), the problem can be presented as follows:

$$\min \max_{m \in M} \left\{\sum_{i \in S_m} r_{mi} \overline{\Phi}(k_i)\right\}$$

$$s.t. \sum_{i \in S} c_i \sigma_i H(k_i) \leq B,$$

where $c_i$ is the unit cost of the on-hand inventory of component, i, and $B > 0$ is a given parameter, the budget limit on the expected overall inventory cost. Recall that $\sigma_i H(k_i)$ is the expected on-hand inventory of component i (refer to equation (12)) and $\sigma_i$ follows the specification in equation (16).

To solve the above optimization problem, we first apply a transformation of variables. Let $$x_i := \overline{\Phi}(k_i), \text{ or } k_i = \overline{\Phi}^{-1}(x_i) \quad (28)$$

Next, denote $$g(x) := H(\Phi^{-1}(x)).$$

We can then reformulate the problem as follows:

$$\min \beta \tag{29}$$

$$s.t. \sum_{i \in S_m} r_{mi} x_i \leq \beta, \, m \in M \tag{30}$$

$$\sum_{i \in S} c_i \sigma_i g(x_i) \leq B \tag{31}$$

Here, the objective value $\beta$ represents the upper limit on the stockout probability (or, "no-fill rate") over any product types.

Several remarks are in order:
(i) Note that $H(\bullet)$ is an increasing and convex function, as evident from the first equality in equation (14), while is decreasing and convex (convex when the variable takes values on the non-negative half-line). Hence, $g(\bullet)$ is a decreasing and convex function.
(ii) For two-end-products, m and m', if $S_{m'} \subset S_m$ and $r_{m'i} \leq r_{mi}$ for $i \in S_{m'}$, then the constraint corresponding to m' becomes superfluous. We assume in the above formulation, all such superfluous constraints have already been removed through preprocessing: (Note, however, the demand for such end-products (as type m') will still contribute to the calculation of $\sigma_1$ in inequality (31), if $m' \in M_i$.)
(iii) The constraint in inequality (31) is always binding, since $g(\bullet)$ is decreasing as explained in (i).

The Lagrangian corresponding to the above optimization problem is:

$$L = B + \sum_{m \in M} \lambda_m \left( \sum_{i \in S_m} r_{mi} x_i - \beta \right) + \eta \left[ \sum_{i \in S} c_i \sigma_i g(x_i) - B \right],$$

where $\lambda_m > 0$ ($m \in M$) and $\eta \geq 0$ are the Lagrangian multipliers. Hence, the optimal solution can be obtained from solving the following system of non-linear equations:

$$\sum_{m \in M} r_{mi} \lambda_m = -\eta c_i \sigma_i g'(x_i), \, i \in S \tag{32}$$

$$\sum_{m \in M} \lambda_m = 1 \tag{33}$$

$$\sum_{i \in S} c_i \sigma_i g(x_i) = B \tag{34}$$

$$\sum_{i \in S_m} r_{mi} x_i = \beta, \, m \in M \text{ and } \lambda_m > 0 \tag{35}$$

As there is no easy way to solve the above system of non-linear equations, we propose a greedy algorithm, which works as follows: We first discretize the problem—let $\Delta$ be the step size. For instance, set $\Delta = 0.01\%$ (one basis points), and start with $x_i = 0$ for all i. At each step, we identify the variable $x_{i^*}$, such that increasing $x_{i^*}$ to $x_{i^*} + \Delta$ will yield the smallest increase in the objective value. This corresponds to identifying whether the maximum, over all $m \in M$, of the left hand side of inequality (30) will either (i) remain the same or (ii) increase by a positive amount.

Consider case (i) first, i.e., there is a subset, denoted $A \subset S$, such that for any $i \in A$, we can increase $x_i$ to $x_i + \Delta$, without affecting the current $\beta$ value in the algorithm. In this case, we pick the index $i^* \in A$ as follows:

$$i^* = \underset{i \in A}{\operatorname{argmax}} \{ c_i \sigma_i [g(x_i) - g(x_i + \Delta)] / r_{mi} \}. \tag{36}$$

In the complement case (ii), increasing $x_i$ (by $\Delta$) for any $i \in S$ will result in a positive increase in the $\beta$ value. In this case, we still follow (36) to pick the index $i^*$, replacing A by S. That is, we choose $i^*$ such that it will result in the smallest increase in $\beta$ but in the largest reduction in inventory budget.

The above procedure is continued until the inventory budget constraint is satisfied; i.e., until the left hand side of inequality (31) is brought down to B or less.

The main computation involved in each step of the above algorithm is to evaluate the increment $$c_i \sigma_i [g(x_i) - g(x_i + \Delta)].$$

Since $\Delta$ is a small increment, we can approximate the above difference by the derivative, $$c_i \sigma_i [-g'(x_i + \Delta/2)] \cdot \Delta.$$

Note that from equation (10), we have $$H'(x) = -x\phi(x) + \Phi(x) + x\phi(x) = \Phi(x).$$

And, $$\left[ \Phi^{-1}(x) \right]' = \frac{-1}{\phi(\Phi^{-1}(x))}.$$

Hence, $$-g'(x) = -\Phi(\Phi^{-1}(x)) \cdot \frac{-1}{\phi(\Phi^{-1}(x))} = \frac{1-x}{\phi(\Phi^{-1}(x))}. \tag{37}$$

Figure 2A:
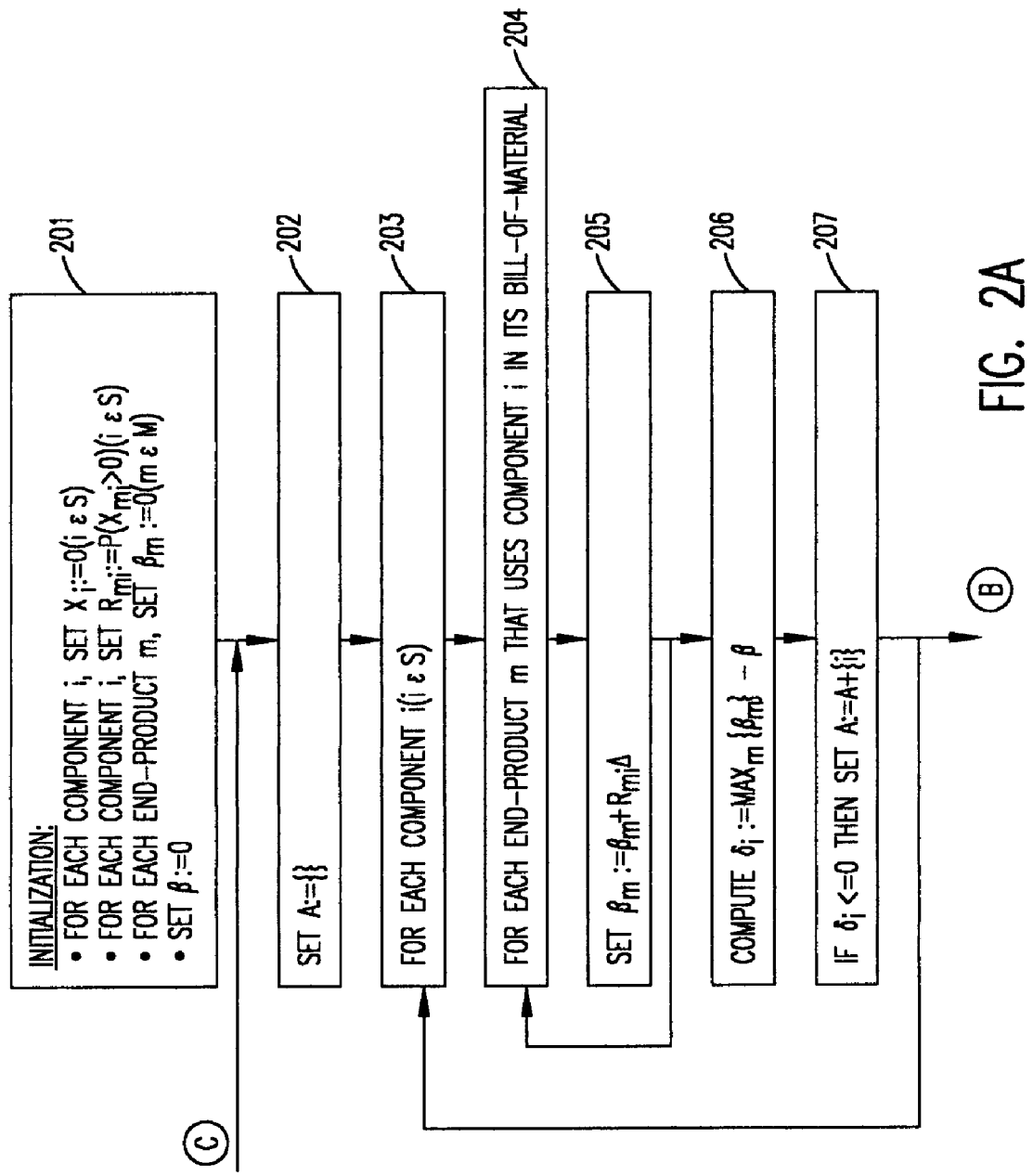
FIGS. 2A and 2B, taken together, are a flow diagram of an implementation of the inventory optimization algorithm according to the invention.
Figure 2B:
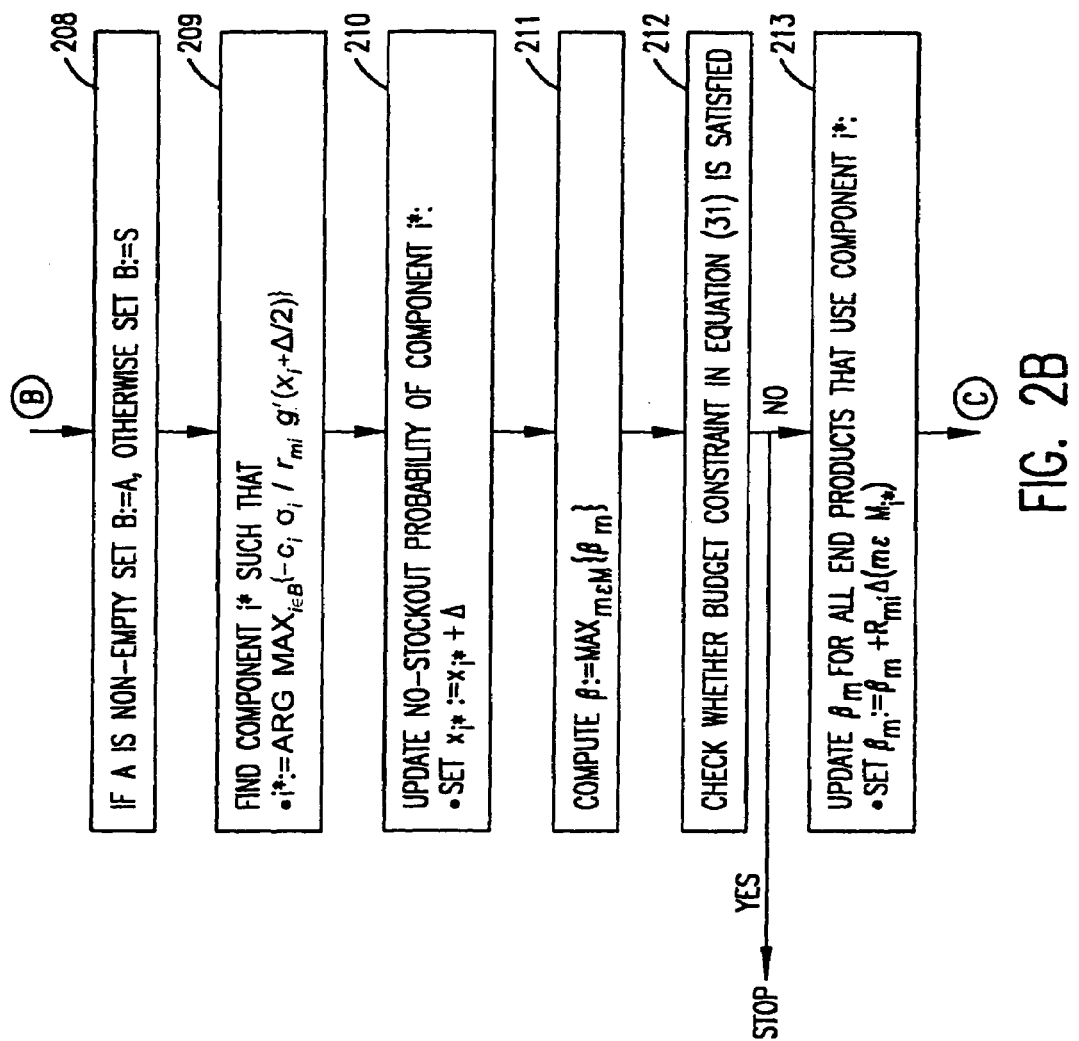

To summarize, the algorithm is implemented as illustrated in the flow diagram of FIG. 2. The process begins with an initialization phase in function block 201 in which:

For each $i \in S$, set $x_i := 0$.
For each $i \in S$, set $r_{mi} := P(X_{mi} > 0)$
For each $m \in M$, set $\beta_m := 0$.
Set $\beta := 0$.

At this point, the process enters the outer one of three nested processing loops. The first step is to initialize the set of active building blocks, A, to A={ } in function block 202. Then the second processing loop is entered in function block 203 which considers each $i \in S$, followed by entering the third processing loop in function block 204 which considers each end product m that uses component i in its bill-of-material. In function block 205, set $\beta_m = \beta_m + r_{mi}\Delta$, for all m such that $i \in S_m$ to perform the processing in the third nested processing loop. Then, in function block 206, compute $\delta_i := \max_m \{\beta_m\} - \beta$. A determination is made in decision block

207 to determine if $\delta_i \leq 0$. If so, then add i to the set of active building blocks, $A := A + \{i\}$, to complete the processing in the second nested processing loop. In function block 208, determine if the set of active components A is non-empty; if so, set $B := A$. otherwise set $B := S$ where B is a set of component indexes. In function block 209, find $i^* := \arg\max_{i \in B}\{-c_i\sigma_i/r_{mi}g'(x_i + \Delta/^2)\}$, where $-g'(\bullet)$ follows equation (37). In function block 210, set $x_i^* := x_i^* + \Delta$ to update the no-stockout probability of component $i^*$. In function block 211, compute $\beta = \max_{m \in M}\beta_m$, and in function block 212, check whether inequality (31) is satisfied. If yes, stop; otherwise, in function block 213 update $\beta_m$ for each $m \in M_{i^*}$, set $\beta_m := \beta_m + r_{mi}\Delta$, and go to function block 202 to complete the first processing loop.

When there is only a single product type, the above algorithm is guaranteed to yield the optimal solution (modulo the discretization). For multiple product types, to solve the problem to optimality would require, at each step, the examination of all subsets of S, instead of just the individual components $i \in S$. For instance, if components i and j are involved in two different product types, then it is possible, at some step, to increase both $x_i$ and $x_j$ to $x_i + \Delta$ and $x_j + \Delta$ without increasing the objective value.

Another case of interest is when each end product has (at least) one unique component, which we denote as $i_m$ for product m. That is, $M_{i_m} = \{i_m\}$ is a singleton set. In this case, it is quite easy to check the solution returned by the greedy algorithm to determine whether the solution satisfies the optimality conditions in equations (32) to (35). To do so, first note that equation (34) is always satisfied. Furthermore, equation (35) is also automatically satisfied in this case. For if $\Sigma_{i \in S_l} r_{mi} x_i < \beta$ for some end product $l \in M$, then we can always increase the value of $x_{i_l}$ that corresponds to the unique component $i_l$; and this will only decrease the overall inventory budget, since $g(x_{i_l})$ is decreasing in $x_{i_l}$. Hence, we only need to check equations (32) and (33). From equation (32), taking into account $M_{i_l} = \{i_m\}$, we obtain $$\lambda_m = \eta \frac{c_{i_m}\sigma_{i_m}g'(x_{i_m})}{r_{mi_m}}, m \in M,$$

which, along with equation (33), yields $$\eta = \left[\sum_{m \in M} \frac{c_{i_m}\sigma_{i_m}g'(x_{i_m})}{r_{mi_m}}\right]^1.$$

What then remains is to check whether or not the $\lambda_m$'s and $\eta$ derived from the above, along with the $x_i$'s returned from the algorithm, satisfy equation (32), for $i \in S \setminus \{i_m, m \in M\}$, the non-unique components.

The "dual" to the above optimization problem is to minimize the expected total inventory cost, subject to the stockout probability of each product no greater than $\beta$, a given parameter. That is, $$\min \sum_{i \in S} c_i \sigma_i H(\Phi^{-1}(x_i)) \quad (38)$$

-continued $$s.t. \sum_{i \in S_m} r_{mi} x_i \leq \beta, m \in M \quad (39)$$

The greedy heuristic described earlier still applies. The only difference is the stopping criterion. Here, we stop when some (if not all) of the constraints in (39) become binding such that no $x_i$ values can be further increased. (That is, the set of end products corresponds to these binding constraints spans over the entire set of components S.)

Figure 3A:
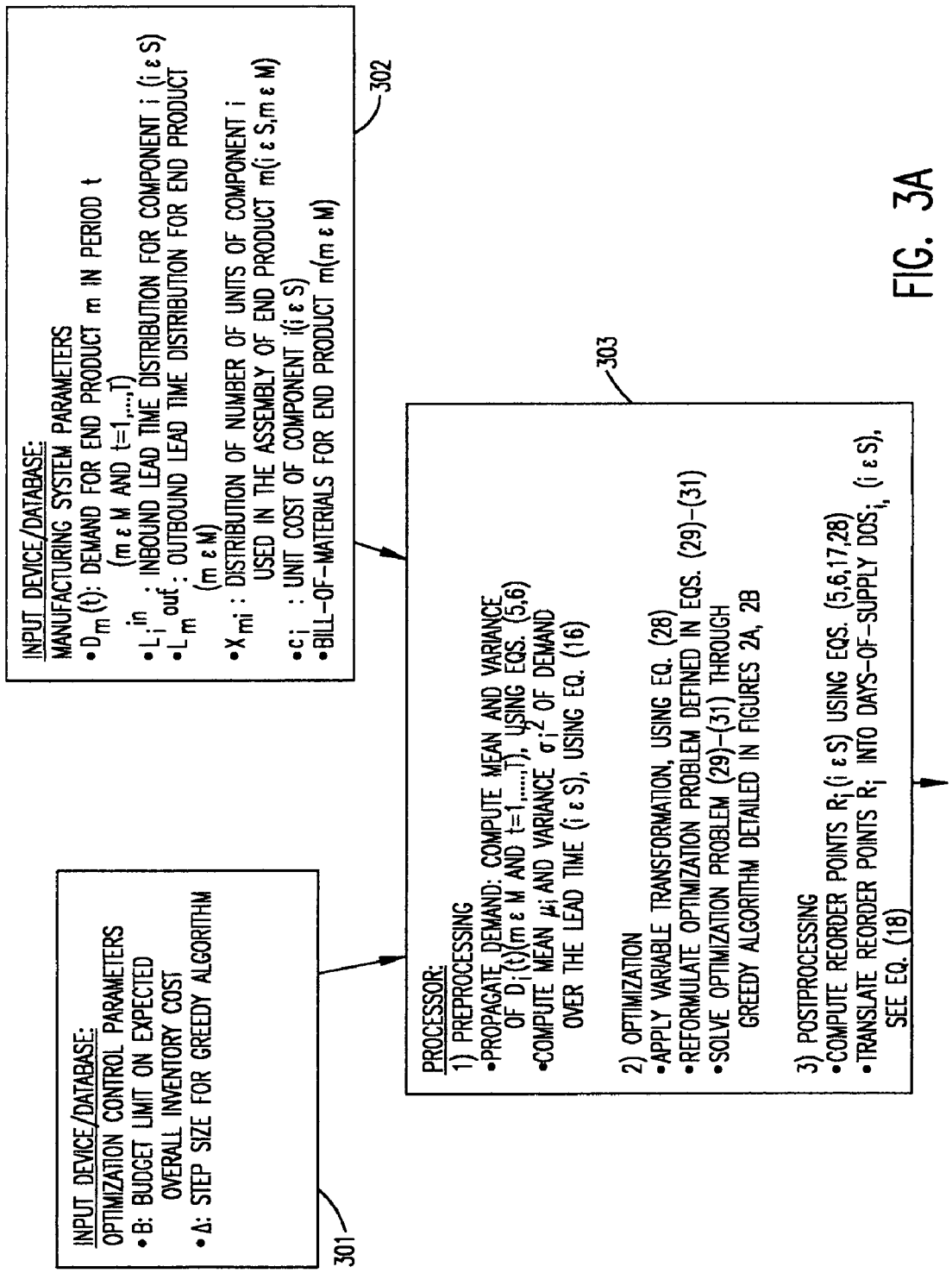
FIGS. 3A and 3B, taken together, are a block diagram showing a hardware platform on which the invention may be implemented.
Figure 3B:
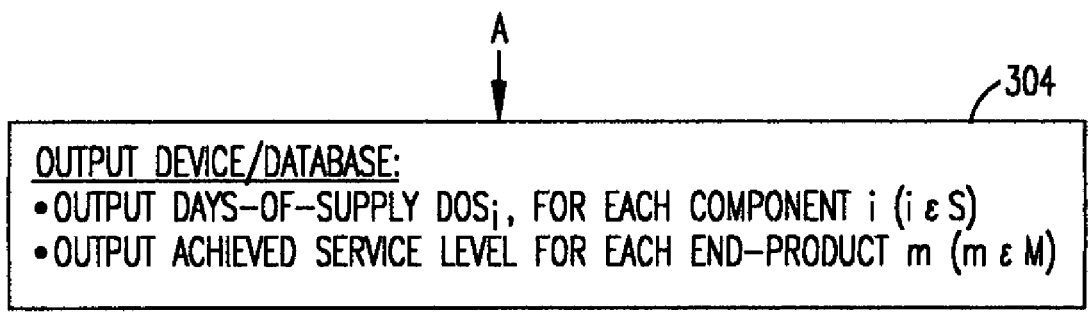

FIG. 3 illustrates in block diagram form a hardware platform on which the algorithm illustrated in the flow diagram of FIG. 2 may be implemented. There are illustrated two databases 301 and 302 which provide inputs to processor 303. Database 301 contains optimization control parameters; specifically, budget limit on expected overall inventory cost and step size for the greedy algorithm. Database 302 contains manufacturing system parameters. These are (i) demand for end product $m \in M$ in period $t = 1, 2, \ldots, T$, (ii) inbound leadtime distribution for component $i \in S$, (iii) outbound leadtime distribution for end product $m \in M$, (iv) the distribution of the number of units of component i used in the assembly of end product $m \in M$, (v) unit cost of component $i \in S$, and (5) bill-of-materials for end product $m \in M$. The processor 303 accesses these databases and first performs preprocessing steps of propagating demand using equations (5) and (6) and computing the mean and variance of the demand over the leadtime using equation (16). After the preprocessing, the processor performs optimization processing. This includes applying variable transformation using equation (28), reformulating the optimization problem using equations (29) to (31), and solving the optimization problem through the greedy algorithm as illustrated in the flow diagram of FIG. 2. Finally, the processor enters the post-processing phase where the reorder points are computed using equations (5), (6), (17), and (28) and the reorder points are translated into days-of-supply using equation (18). The processor 303 outputs the computed information to an output device or database 304, this information including output days-of-supply for each component $i \in S$ and output achieved service level for each end product $m \in M$ Numerical Results The purpose of this section is to illustrate numerically the effectiveness of the model and the algorithm developed above.

Problem Data

Consider a family of desktop computers that consists of six different end products, denoted PC 1–PC 6, which are configured from a set of 17 different components, or building blocks. The components are obtained from external suppliers with different supply leadtimes. Table 1 summarizes the data used in the numerical study, including the unit cost of each component and the supply leadtime (including time for shipment).

Each end product is configured from a set of building blocks as defined by its bill-of-material (BOM). The BOM structure is displayed in Table 2. The final assembly process, for each end product, takes no more than 1 to 2 hours, which is order-of-magnitude shorter than the component leadtime. So this fits well with the scenario discussed above.

We remark that the data provided in Tables 1 and 2 are based, on real data from the PC assembly system of a major computer manufacturer. To protect company confidentiality, we have altered the values of the data. The modified values, however, are still relatively close to a realistic product representation.

We examine the performance of our model under several parameter settings. The parameters varied include the budget limit on the expected inventory cost, demand variability (in terms of the coefficient of variation), and the BOM structure. We also investigate the performance of the model when applied in a non-stationary demand environment. We check the results obtained from the optimization against Monte-Carlo simulation. Simulation point estimates and confidence intervals were constructed from twenty independent replications with 1,000 time periods in each replication.

TABLE 1

Unit Costs and Supply Leadtimes of the Components

| Product | Cost (in $) | Component | Cost (in $) | Leadtime (in days) |
|---|---|---|---|---|
| PC 1 | 1099 | Memory 64MB | 290 | 15 |
| PC 2 | 1331 | Processor 450 MHZ | 307 | 12 |
| PC 3 | 1308 | Processor 500 MHZ | 538 | 12 |
| PC 4 | 1243 | Processor 550 MHZ | 391 | 12 |
| PC 5 | 1243 | Processor 600 MHZ | 799 | 12 |
| PC 6 | 1098 | Shell | 42 | 5 |
|  |  | Shell (Common Parts 1) | 114 | 8 |
|  |  | Shell (Common Parts 2) | 114 | 8 |
|  |  | Hard Drive 6.8 GB | 155 | 18 |
|  |  | Hard Drive 13.5 GB | 198 | 18 |
|  |  | Hard Drive (Common Parts) | 114 | 8 |
|  |  | CD ROM | 43 | 10 |
|  |  | CD ROM (Common Parts) | 114 | 10 |
|  |  | Video Graphics Card | 114 | 6 |
|  |  | Ethernet Card | 114 | 10 |
|  |  | Software Pre-Load 1 | 114 | 4 |
|  |  | Software Pre-Load 2 | 114 | 4 |

TABLE 2

BOM Structure

| | Component Usage | | | | | |
|---|---|---|---|---|---|---|
| | PC 1 | PC 2 | PC 3 | PC 4 | PC 5 | PC 6 |
| Memory 64MB | 1 | 1 | 1 | 1 | 1 | 1 |
| Processor 450 MHZ | 1 | | | | | |
| Processor 500 MHZ | | 1 | | | | |
| Processor 550 MHZ | | | 1 | 1 | 1 | |
| Processor 600 MHZ | | | | | | 1 |
| Shell | 1 | 1 | 1 | 1 | 1 | 1 |
| Shell (Common Parts 1) | 1 | 1 | 1 | 1 | 1 | 1 |
| Shell (Common Parts 2) | 1 | 1 | 1 | 1 | 1 | 1 |
| Hard Drive 6.8 GB | 1 | 1 | | | | 1 |
| Hard Drive 13.5 GB | | | 1 | 1 | 1 | |
| Hard Drive (Common Parts) | 1 | 1 | 1 | 1 | 1 | 1 |
| CD ROM | | | 1 | | | |
| CD ROM (Common Parts) | | | 1 | | | |
| Video Graphics Card | 1 | 1 | 1 | 1 | 1 | |
| Ethernet Card | | | 1 | | | |
| Software Pre-Load 1 | 1 | 1 | 1 | | 1 | |
| Software Pre-Load 2 | | | | | 1 | |

Demand Variability

We first study the effect of demand variability on the service level, inventory budget, and optimal base-stock levels. Assume that demand for the six end products is independently identically distributed among the products and over the time, with a mean of $E(D_m)=100$ per period; the coefficient of variation is 0.2, 0.4, and 1.0. The budget limits are varied so as to obtain service levels (no-stockout probabilities) at about 90%, 95%, and 98%. The basic time period in all cases is one day.

Tables 3 to 5 summarize the numerical results for these cases. The column labeled "opt." shows the optimal no-stockout probabilities of the end products for t e given inventory budget. The column labeled "sim." shows the corresponding 95% confidence interval obtained from simulation. Input to the simulation are the base-stock levels for the building blocks generated by the optimization model. The base-stock level of each end product is zero, since each end product follows aft configure-to-order operation.

TABLE 3

Comparison for End-Product Service Levels; $E(D_m)$ 100; $cv(D_m) = 0.2$

| | B = 800,000 | | B = 900,000 | | B = 1,000,000 | |
|---|---|---|---|---|---|---|
| | sim. | opt. | sim. | opt. | sim. | opt. |
| PC 1 | 0.949 ± 0.010 | 0.923 | 0.975 ± 0.006 | 0.963 | 0.989 ± 0.004 | 0.984 |
| PC 2 | 0.949 ± 0.007 | 0.923 | 0.975 ± 0.005 | 0.963 | 0.989 ± 0.004 | 0.984 |
| PC 3 | 0.980 ± 0.004 | 0.923 | 0.990 ± 0.003 | 0.963 | 0.995 ± 0.002 | 0.984 |
| PC 4 | 0.966 ± 0.005 | 0.923 | 0.982 ± 0.004 | 0.963 | 0.991 ± 0.003 | 0.984 |
| PC 5 | 0.991 ± 0.003 | 0.945 | 0.995 ± 0.003 | 0.974 | 0.997 ± 0.002 | 0.988 |
| PC 6 | 0.945 ± 0.007 | 0.923 | 0.973 ± 0.005 | 0.963 | 0.988 ± 0.004 | 0.983 |

TABLE 4

Comparison for End-Product Service Levels;
$E(D_m)$ 100; $cv(D_m) = 0.4$

| | B = 1,500,000 | | B = 1,750,000 | | B = 2,000,000 | |
|---|---|---|---|---|---|---|
| | sim. | opt. | sim. | opt. | sim. | opt. |
| PC 1 | 0.927 ± 0.013 | 0.892 | 0.969 ± 0.007 | 0.956 | 0.989 ± 0.004 | 0.984 |
| PC 2 | 0.928 ± 0.008 | 0.892 | 0.970 ± 0.006 | 0.956 | 0.989 ± 0.004 | 0.984 |
| PC 3 | 0.969 ± 0.006 | 0.892 | 0.987 ± 0.003 | 0.956 | 0.995 ± 0.003 | 0.984 |
| PC 4 | 0.949 ± 0.007 | 0.892 | 0.978 ± 0.004 | 0.956 | 0.990 ± 0.003 | 0.984 |
| PC 5 | 0.983 ± 0.004 | 0.923 | 0.993 ± 0.003 | 0.969 | 0.997 ± 0.002 | 0.988 |
| PC 6 | 0.919 ± 0.009 | 0.892 | 0.967 ± 0.005 | 0.955 | 0.988 ± 0.004 | 0.983 |

TABLE 5

Comparison for End-Product Service Levels;
$E(D_m)$ 100; $cv(D_m) = 0.2$

| | B = 800,000 | | B = 900,000 | | B = 1,000,000 | |
|---|---|---|---|---|---|---|
| | sim. | opt. | sim. | opt. | sim. | opt. |
| PC 1 | 0.926 ± 0.013 | 0.923 | 0.951 ± 0.011 | 0.957 | 0.967 ± 0.009 | 0.977 |
| PC 2 | 0.926 ± 0.013 | 0.923 | 0.949 ± 0.008 | 0.957 | 0.967 ± 0.007 | 0.977 |
| PC 3 | 0.954 ± 0.007 | 0.923 | 0.970 ± 0.005 | 0.957 | 0.981 ± 0.004 | 0.977 |
| PC 4 | 0.933 ± 0.008 | 0.923 | 0.953 ± 0.007 | 0.957 | 0.967 ± 0.006 | 0.977 |
| PC 5 | 0.971 ± 0.006 | 0.945 | 0.981 ± 0.005 | 0.970 | 0.988 ± 0.004 | 0.984 |
| PC 6 | 0.928 ± 0.011 | 0.923 | 0.953 ± 0.009 | 0.957 | 0.969 ± 0.008 | 0.977 |

Observe that the no-stockout probabilities returned from the optimization model is generally conservative; i.e., lower than the simulated values. This is expected as the off-shelf availability of each end product used in the optimization model is a lower bound of the true value, as explained above. Also observe that the bound becomes tighter as the service level increases, along with the increased budget. Furthermore, the bound appears to be closer to the simulation results as the coefficient of variation (of demand) increases.

Among the six end-products, PC 5 is the only one that does not have a unique component. Observe that it alone achieves a higher service level than the other five end-products, which all have the same service level. In other words, all end-products with unique components have binding constraints in inequality (24), whereas PC 5 exceeds this service level.

For the same cases, Table 6 summarizes the comparison for the expected overall inventory costs. It is interesting to note that while the simulation runs result in higher service levels, the associated inventory costs are also slightly higher. (The relative error, however, is still well below 5%.) This suggests that in applications, when the inventory budget is a "hard" constraint, we need to input into the optimization model an inventory budget limit that is about 5% lower than its real value.

TABLE 6

Comparison for Expected Inventory Costs;
$E(D_m) = 100$

| $cv(D_m) = 0.2$ | | | $cv(D_m) = 0.4$ | | | $cv(D_m) = 1.0$ | | |
|---|---|---|---|---|---|---|---|---|
| opt. | sim. | rel.err. | opt. | sim. | rel.err. | opt. | sim. | rel.err. |
| 800,000 | 841,819 | 4.9% | 1,500,000 | 1,554,728 | 2.5% | 4,000,000 | 4,056,800 | 1.4% |
| 900,000 | 923,893 | 3.5% | 1,750,000 | 1,774,716 | 1.4% | 4,400,000 | 4,419,355 | 0.5% |
| 1,000,000 | 1,014,657 | 1.4% | 2,000,000 | 2,010,165 | 0.4% | 4,800,000 | 4,792,957 | 0.1% |

Table 7 displays the solution found by the optimization model for the case of $cv(D_m)=1.0$. For every component, the optimal solution is shown in three forms: base-stock level $R_i^*$, safety factor $k_i^*$, and days-of-supply $DOS_i$. Clearly, these (optimal) values all increase as, the overall budget increases. The results also illustrate the effect of risk pooling: the higher the degree of commonality of a component, the lower the amount of safety stock required to maintain the service level. For instance, the safety stock for the 64 MB memory module, which is used in all six products, varies between 3.86 and 4.48 days-of-supply, whereas the safety stock for the ethernet card, which is unique to PC 3, is roughly twice that amount.

TABLE 7

Optimal Solution in Terms of Base-stock Levels,
Safety Factors, and Days-of-Supply;
$E(D_m) = 100$; $cv(D_m) = 1.0$

|  | B = 4,000,000 | | | B = 4,400,000 | | | B = 4,800,000 | | |
| --- | --- | --- | --- | --- | --- | --- | --- | --- | --- |
|  | $R_i^*$ | $k_i^*$ | $DOS_i$ | $R_i^*$ | $k_i^*$ | $DOS_i$ | $R_i^*$ | $k_i^*$ | $DOS_i$ |
| Memory 64 MB | 11318 | 2.44 | 3.86 | 11509 | 2.64 | 4.18 | 11689 | 2.83 | 4.48 |
| Processor 450 MHz | 1760 | 1.62 | 5.60 | 1856 | 1.89 | 6.55 | 1950 | 2.16 | 7.49 |
| Processor 500 MHz | 1760 | 1.61 | 5.59 | 1856 | 1.89 | 6.55 | 1950 | 2.16 | 7.49 |
| Processor 550 MHz | 4793 | 1.99 | 3.98 | 4940 | 2.23 | 4.46 | 5088 | 2.48 | 4.96 |
| Processor 600 MHz | 1745 | 1.57 | 5.45 | 1842 | 1.85 | 6.42 | 1936 | 2.12 | 7.35 |
| Shell | 4803 | 3.29 | 3.00 | 4880 | 3.43 | 3.13 | 4940 | 3.54 | 3.23 |
| Shell (Common Parts 1) | 6818 | 2.91 | 3.36 | 6922 | 3.06 | 3.54 | 7045 | 3.24 | 3.74 |
| Shell (Common Parts 2) | 6818 | 2.91 | 3.36 | 6922 | 3.06 | 3.54 | 7045 | 3.24 | 3.74 |
| Hard Drive 6.8 GB | 7251 | 2.52 | 6.17 | 7390 | 2.71 | 6.63 | 7540 | 2.91 | 7.13 |
| Hard Drive 13.5 GB | 7028 | 2.21 | 5.42 | 7192 | 2.44 | 5.97 | 7356 | 2.66 | 6.52 |
| Hard Drive (Common Parts) | 6818 | 2.91 | 3.36 | 6942 | 3.09 | 3.57 | 7045 | 3.24 | 3.74 |
| CD ROM | 1863 | 2.73 | 8.62 | 1921 | 2.91 | 9.21 | 1978 | 3.09 | 9.77 |
| CD ROM (Common Parts) | 1742 | 2.35 | 7.42 | 1809 | 2.56 | 8.08 | 1877 | 2.77 | 8.76 |
| Video Graphics Card | 4538 | 2.81 | 3.08 | 4638 | 2.99 | 3.27 | 4729 | 3.16 | 3.46 |
| Ethernet Card | 1742 | 2.35 | 7.42 | 1809 | 2.56 | 8.0 | 1877 | 2.77 | 8.76 |
| Software Pre-Load 1 | 2740 | 2.85 | 2.85 | 2805 | 3.01 | 3.01 | 2878 | 3.19 | 3.19 |
| Software Pre-Load 2 | 795 | 1.97 | 3.94 | 842 | 2.21 | 4.41 | 889 | 2.44 | 4.88 |

Unique Components

Next, we illustrate the special case that each end-product involves at least one unique component, in particular, the verification of the optimality equations (26) to (29), as discussed at the end of the last section. Recall, in the above example, PC 5 is the only end-product that does not have a unique component. To obtain a scenario where each end product has at least one unique component, we modify the original bills-of-materials structure by letting PC 3 and PC 4 both use the 6.8 GB hard drive, while reserving the 13.5 GB hard drive as a unique component for PC 5. This way, PC 5, like all the other end-products, also has unique component.

We run the greedy algorithm on this modified BOM structure fo the case of $cv(D_m)=1.0$. The results are summarized in Tables 8 and 9. Notice that the six end products now achieve the same service level because they all have unique components, and thus all constraints in inequality (24) become binding.

TABLE 8

Comparison for End-Product Service Levels
(With Each End-Product Having at Least One Unique Component);
$E(D_m) = 100$; $cv(D_m) = 1.0$

|  | B = 4,000,000 | | B = 4,400,000 | | B = 4,800,000 | |
| --- | --- | --- | --- | --- | --- | --- |
|  | sim. | opt. | sim. | opt. | sim. | opt. |
| PC 1 | 0.934 ± 0.012 | 0.933 | 0.956 ± 0.010 | 0.963 | 0.971 ± 0.008 | 0.981 |
| PC 2 | 0.932 ± 0.009 | 0.933 | 0.956 ± 0.007 | 0.963 | 0.971 ± 0.006 | 0.981 |
| PC 3 | 0.961 ± 0.006 | 0.933 | 0.975 ± 0.005 | 0.963 | 0.985 ± 0.003 | 0.981 |
| PC 4 | 0.940 ± 0.007 | 0.933 | 0.958 ± 0.006 | 0.963 | 0.972 ± 0.005 | 0.981 |

TABLE 8-continued

Comparison for End-Product Service Levels
(With Each End-Product Having at Least One Unique Component);
$E(D_m) = 100$; $cv(D_m) = 1.0$

|  | B = 4,000,000 | | B = 4,400,000 | | B = 4,800,000 | |
| --- | --- | --- | --- | --- | --- | --- |
|  | sim. | opt. | sim. | opt. | sim. | opt. |
| PC 5 | 0.946 ± 0.009 | 0.933 | 0.965 ± 0.008 | 0.963 | 0.978 ± 0.007 | 0.981 |
| PC 6 | 0.936 ± 0.010 | 0.933 | 0.959 ± 0.009 | 0.963 | 0.973 ± 0.007 | 0.981 |

When comparing the results for the original and modified BOM structures as shown in Tables 7 and 9, we find that the optimization produces similar days-of-supply targets for all components except the two hard drives. The safety stock of the 13.5 GB hard drive increases from 5.42 to 8.19 days-of-supply, whereas that of the 6.8 GB hard drive decreases from 6.17 to 5.05 days-of-supply. This again is a consequence of risk-pooling because modifying the BOM structure increases the commonality of the high-capacity hard drive, and at the same time decreases the commonality of the low-capacity hard drive.

To verify the optimality equations, recall from the discussion above that we first determine the Lagrangian multipliers, $\lambda_m$ and $\eta$, based on the solutions returned by the algorithm, and then check the equations in (26) for all the non-unique components. Table 10 lists the gap, labeled "abs.err.", between the left hand side and the right hand side of the equations in (26) for all the non-unique components. The gap is indeed very small, on the order of $10^{-8}$ or below. This clearly indicates that in this case the greedy algorithm has returned an optimal solution. (That there is a gap at all is mainly due to discretization.) The other two cases, with the coefficients of variation being 0.2 and 0.4, yield similar results.

TABLE 9

Optimal Solution in Terms of Base-Stock Levels,
Safety Factors, and Days-of-Supply (With Each End-Product
Having at Least One Unique Component);
$E(D_m) = 100; cv(D_m) = 1.0$

| | B = 4,000,000 | | | B = 4,400,000 | | | B = 4,800,000 | | |
|---|---|---|---|---|---|---|---|---|---|
| | $R_i^*$ | $k_i^*$ | DOS | $R_i^*$ | $k_i^*$ | DOS | $R_i^*$ | $k_i^*$ | DOS |
| Memory 64 MB | 11357 | 2.48 | 3.93 | 11542 | 2.68 | 4.21 | 11731 | 2.88 | 4.55 |
| Processor 450 MHz | 1781 | 1.68 | 5.81 | 1876 | 1.95 | 6.75 | 1970 | 2.22 | 7.69 |
| Processor 500 MHz | 1781 | 1.68 | 5.81 | 1876 | 1.95 | 6.75 | 1970 | 2.22 | 7.69 |
| Processor 550 MHz | 4788 | 1.98 | 3.96 | 4936 | 2.23 | 4.45 | 5088 | 2.48 | 4.96 |
| Processor 600 MHz | 1767 | 1.63 | 5.66 | 1863 | 1.91 | 6.62 | 1956 | 2.18 | 7.56 |
| Shell | 4837 | 3.35 | 3.06 | 4940 | 3.54 | 3.23 | 5038 | 3.72 | 3.40 |
| Shell (Common Parts 1) | 6843 | 2.95 | 3.40 | 6963 | 3.12 | 3.60 | 7080 | 3.29 | 3.80 |
| Shell (Common Parts 2) | 6843 | 2.95 | 3.40 | 6963 | 3.12 | 3.60 | 7080 | 3.29 | 3.80 |
| Hard Drive 6.8 GB | 11525 | 2.66 | 5.05 | 11703 | 2.85 | 5.40 | 11881 | 3.04 | 5.76 |
| Hard Drive 13.5 GB | 2619 | 1.93 | 8.19 | 2724 | 2.18 | 9.23 | 2827 | 2.42 | 10.26 |
| Hard Drive (Common Parts) | 6843 | 2.95 | 3.40 | 6963 | 3.12 | 3.60 | 7080 | 3.29 | 3.80 |
| CD ROM | 1860 | 2.72 | 8.59 | 1921 | 2.91 | 9.21 | 1978 | 3.09 | 9.77 |
| CD ROM (Common Parts) | 1739 | 2.33 | 7.38 | 1807 | 2.55 | 8.06 | 1877 | 2.77 | 8.76 |
| Video Graphics Card | 4561 | 2.85 | 3.12 | 4663 | 3.04 | 3.33 | 4750 | 3.19 | 3.50 |
| Ethernet Card | 1739 | 2.33 | 7.38 | 1807 | 2.55 | 8.06 | 1877 | 2.77 | 8.76 |
| Software Pre-Load 1 | 2752 | 2.88 | 2.88 | 2825 | 3.06 | 3.06 | 2896 | 3.24 | 3.24 |
| Software Pre-Load 2 | 793 | 1.96 | 3.92 | 842 | 2.21 | 4.41 | 890 | 2.45 | 4.89 |

TABLE 10

Optimization Results for Non-Unique Components
(Scenario Where Each End Product Has at Least One Unique
Component); $E(D_m) = 100; cv(D_m) = 1.0$

| | B = 4,000,000 | | B = 4,400,000 | | B = 4,800,000 | |
|---|---|---|---|---|---|---|
| | $x_i^*$ | abs. err. | $x_i^*$ | abs. err. | $x_i^*$ | abs. err. |
| Memory 64MB | 0.0073 | $5.20^{-8}$ | 0.0041 | $3.04^{-8}$ | 0.4983 | $1.68^{-8}$ |
| Processor 550 MHZ | 0.0233 | $3.02^{-8}$ | 0.0129 | $1.84^{-8}$ | 0.4949 | $1.10^{-8}$ |
| Shell | 0.0005 | $5.59^{-8}$ | 0.0003 | $3.78^{-8}$ | 0.4999 | $2.26^{-8}$ |
| Shell (Common Parts 1) | 0.0018 | $5.31^{-8}$ | 0.0011 | $3.20^{-8}$ | 0.4996 | $1.73^{-8}$ |
| Shell (Common Parts 2) | 0.0018 | $5.31^{-8}$ | 0.0010 | $3.20^{-8}$ | 0.4996 | $1.73^{-8}$ |
| Hard Drive 6.8GB | 0.0059 | $5.21^{-8}$ | 0.0034 | $3.10^{-8}$ | 0.4987 | $1.70^{-8}$ |
| Hard Drive (Common Parts) | 0.0018 | $5.31^{-8}$ | 0.0011 | $3.20^{-8}$ | 0.4996 | $1.73^{-8}$ |
| Video Graphics Card | 0.0025 | $4.08^{-8}$ | 0.0014 | $2.58^{-8}$ | 0.4994 | $1.24^{-8}$ |
| Software Pre-Load 1 | 0.0022 | $2.72^{-8}$ | 0.0013 | $1.76^{-8}$ | 0.4995 | $0.93^{-8}$ |

Non-Stationary Demand

We next examine the effectiveness of the algorithm in handling non-stationary demand. For instance, when the demand forecast changes weekly, we can run the optimization model at the beginning of each week using the demand offset scheme described above. The base-stock levels are then updated weekly, based on the outcome of the optimization.

To illustrate this approach, consider the product structure described in Table 1. Consider a planning horizon of 100 weeks, over which the mean demand for each end-product changes weekly, while the coefficient of variation (which measures the forecast error) remains constant. Specifically, we randomly generate the weekly demand from a uniform sample over the interval [525,875], while maintaining the coefficient of variation at 2.646. Using the algorithm that solves the "dual" problem described in (31) and (32), we minimize the total expected inventory cost subject to a set of target no-stockout probabilities, 90%, 95%, and 98% (corresponding to =0.10, 0.05, and 0.02). Table 11 compares the achieved service levels and the total expected inventory cost between simulation and the optimization model. Input to the simulation are the component base-stock levels, by week, generated by the optimization algorithm.

TABLE 11

Comparisons for End-product Service Levels and
Total Inventory Cost in Non-Stationary Demand Environment

|  | $\beta = 0.10$ | | $\beta = 0.05$ | | $\beta = 0.02$ | |
| --- | --- | --- | --- | --- | --- | --- |
|  | sim. | opt. | sim. | opt. | sim. | opt. |
| PC 1 | 0.928 ± 0.009 | 0.900 | 0.952 ± 0.007 | 0.950 | 0.971 ± 0.004 | 0.980 |
| PC 2 | 0.926 ± 0.007 | 0.900 | 0.949 ± 0.005 | 0.950 | 0.969 ± 0.003 | 0.980 |
| PC 3 | 0.944 ± 0.006 | 0.900 | 0.962 ± 0.004 | 0.950 | 0.975 ± 0.003 | 0.980 |
| PC 4 | 0.929 ± 0.007 | 0.900 | 0.951 ± 0.006 | 0.950 | 0.968 ± 0.004 | 0.980 |
| PC 5 | 0.950 ± 0.006 | 0.900 | 0.965 ± 0.004 | 0.950 | 0.978 ± 0.003 | 0.980 |
| PC 6 | 0.922 ± 0.009 | 0.900 | 0.950 ± 0.008 | 0.950 | 0.970 ± 0.005 | 0.980 |
| Total cost | $4,039,913 | $3,830,505 | $4,505,698 | $4,329,152 | $5,077,240 | $4,924,748 |

For 90% and 95% service level targets, the simulated no-stockout probabilities do exceed the values returned by the optimization. At 98% service level, the simulated values are slightly below their analytical counterparts. This is largely due to the weekly update of the base-stock levels: whenever there is an increase in demand, and hence an increase in base-stock levels, from one week to the next, there is a time lag in building up the inventory, due to the supply leadtime, and the available stock may be insufficient to accommodate the increase in demand. This shortfall can be eliminated if the base-stock levels are updated more frequently, say, daily. We further observe that the analytical estimates of the expected total inventory cost are within 5.5% of the simulated values.

Figure 4:
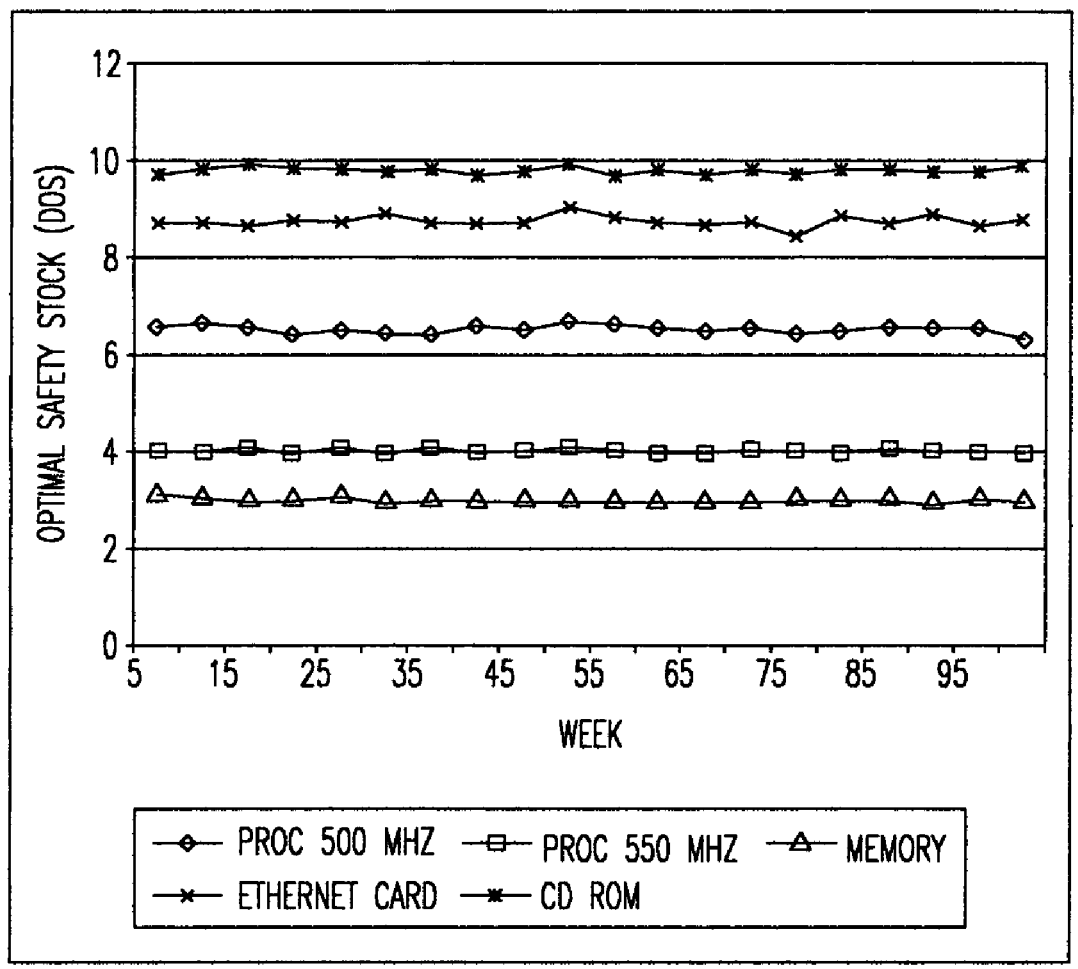
FIG. 4 is a graph of optimal days-of-supply for selected components in non-stationary demand environment for a target service level of 95%.

FIG. 4 shows the optimal safety-stock levels (i.e., base-stock minus work-in-progress (WIP)) converted to days-of-supply (DOS), for a subset of components in the example. Notice that the DOS values fluctuate very little over time. This suggests, in situations where the forecast error (in terms of its coefficient of variation) remains relatively constant over time, it suffices to follow a simple policy that tracks, for each component inventory, a constant DOS target (instead of updating the base-stock levels, which keep changing from period to period). Further, the results clearly demonstrate the benefit of risk-pooling: building blocks that go into a larger number of end products (e.g., memory modules) require much less safety stock than building blocks that are only used in a small number of end products (e.g., CD ROMs).

Process Re-engineering Application

Here we describe the study mentioned earlier, which was part of a larger project aimed at the re-engineering of an existing business process from a build-to-stock operation to an assembly-to-order operation centered around "building blocks" (i.e., keeping inventory only at the component level). To carry out the study, we have developed two basic models: the "as-is" model that is a reflection of the present operation, and the "to-be" model that is based on the optimization model described in the previous sections—in particular, with the component inventory levels generated by the algorithm. For both models, we aggregate the business' production-inventory system into two stages, the first stage consists of the components, or building blocks, and the second stage includes the assembly and the order fulfillment.

Three factors have been identified as focal points of our study:
 (i) manufacturing strategy—the "as-is" operation versus the "to-be" model;
 (ii) the accuracy of demand forecast at the end-product level versus at the component level; and
 (iii) the effect of mass customization as a result of, for instance, direct sales over the internet.

To study the first factor, we select a major product family at the business, which consists of 18 end-products configured from a total of 17 components. We use the business' existing data—including BOM, unit costs, assembly and procurement leadtimes—to run a detailed simulation model. The demand for each end-product is statistically generated, based on historical data. The days-of-supply targets are set to meet a required service level of 95% (for all end-products). Following the business' current practice, these targets are determined using a combination of simple heuristic rules and judgement calls from product managers, and verified by simulation (via trial and error).

We then feed the same data, including the same statitically generated demand streams, into the optimization model, which eliminates the finished-goods inventory at the end-product level and optimally sets the base-stock level for each component inventory. The optimization model minimizes the overall inventory cost while meeting the same service level of 95% for all end-products. We take the optimal base-stock levels, and rerun the simulation to verify the analytical results.

Figure 5:
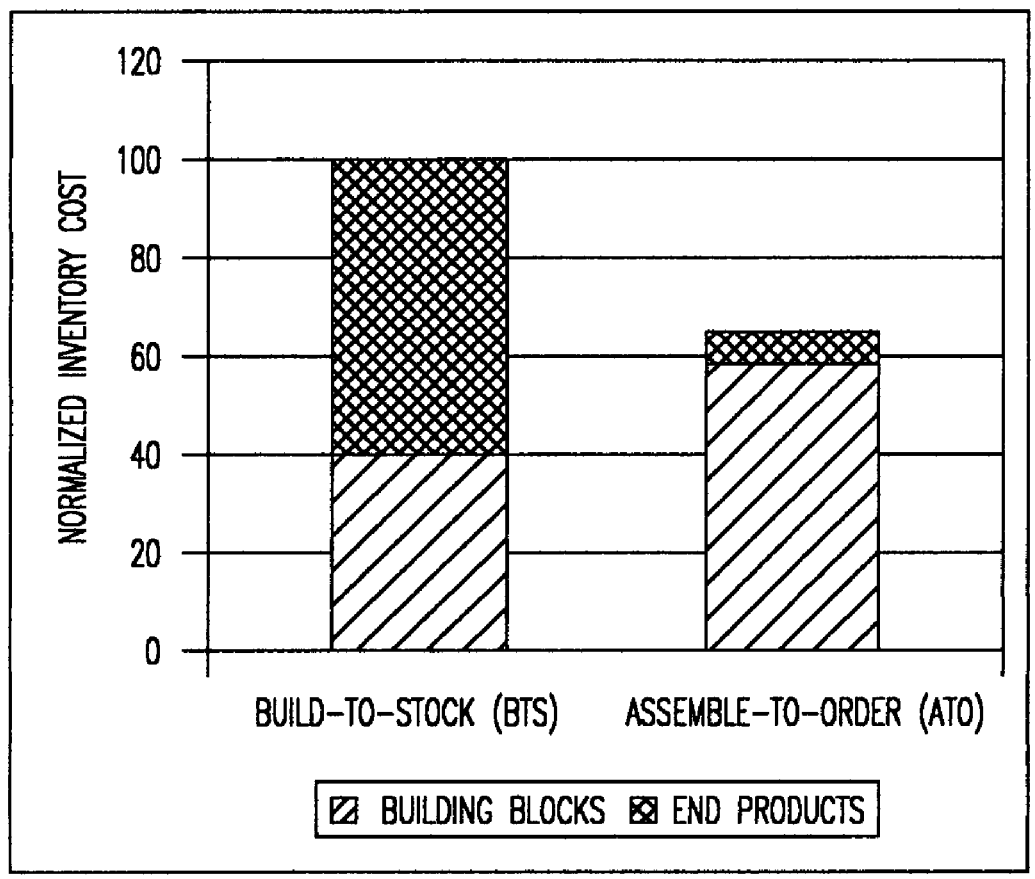
FIG. 5 is a graph showing a comparison between a build-to-stock ("as-is") and an configure-to-order ("to-be") system.

FIG. 5 shows the comparison between the "as-is" and the "to-be" models, in terms of the overall inventory cost. (To protect proprietary information, the vertical axis in all figures is normalized with respect to the inventory cost of the "as-is" model, which is 100.) As expected, the inventory cost at the end-product level is virtually eliminated in the "to-be" model. (The cost shown is due to WIP; the cost due to finished goods is nil.) In contrast, the "as-is" model keeps a significant amount of end-product inventory. On the other hand, the amount of component inventory is higher in the "to-be" model, which is again expected, since the required service level of 95% is common to both models. Overall, the "to-be" model reduces the overall inventory cost by about 30%.

Figure 6:
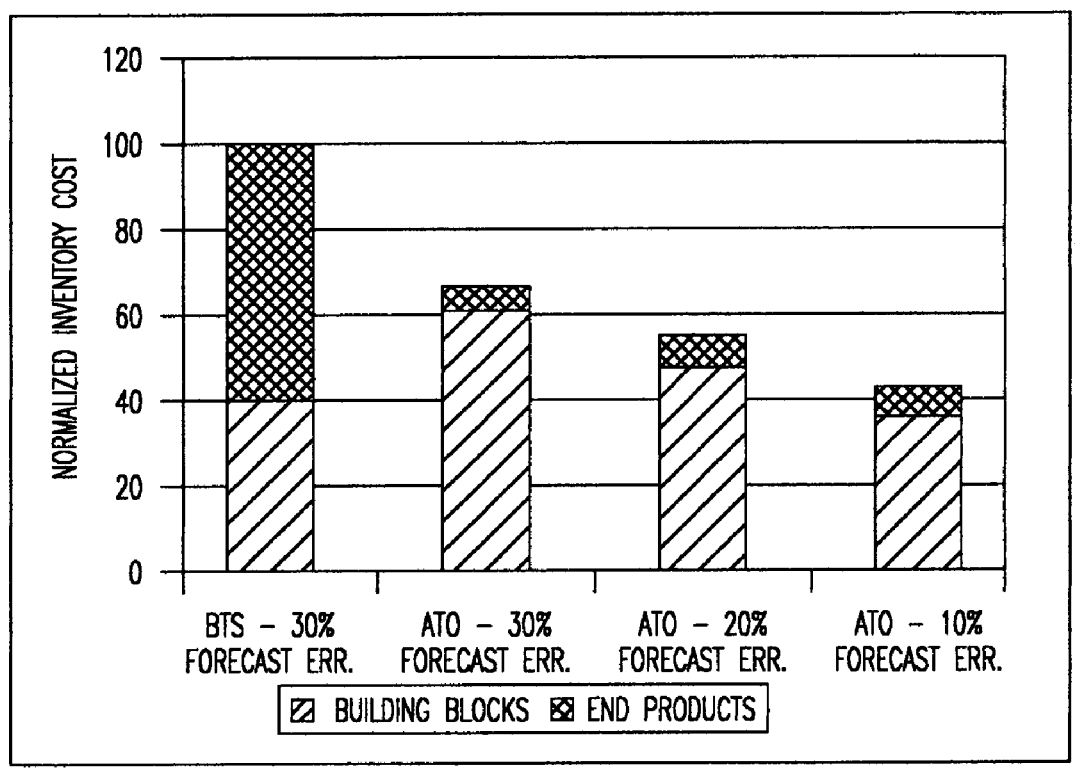
FIG. 6 is a graph showing the effect of improving forecast accuracy.

Note in the above study, both models use the same demand forecast, at the end-product level. The "to-be" model, however, can easily switch to forecasting demand directly at the component level. This will result in improved forecast accuracy, as we can take advantage of parts commonality, as each component is generally used in several end products. Hence, in our study of the second factor, we evaluate the effect of forecast accuracy through a sensitivity analysis. FIG. 6 shows the overall inventory cost associated with three different levels of forecast accuracy. The first two columns, repeat the comparison in the last figure; i.e., both ("as-is" and "to-be" models assume 30% forecast error (i.e., the coefficient of variation equals 0.3) at the end-product level; the next two columns represent improved forecast errors, at 20% and 30%, achieved by the "to-be" model through forecasting at the component level.

Figure 7:
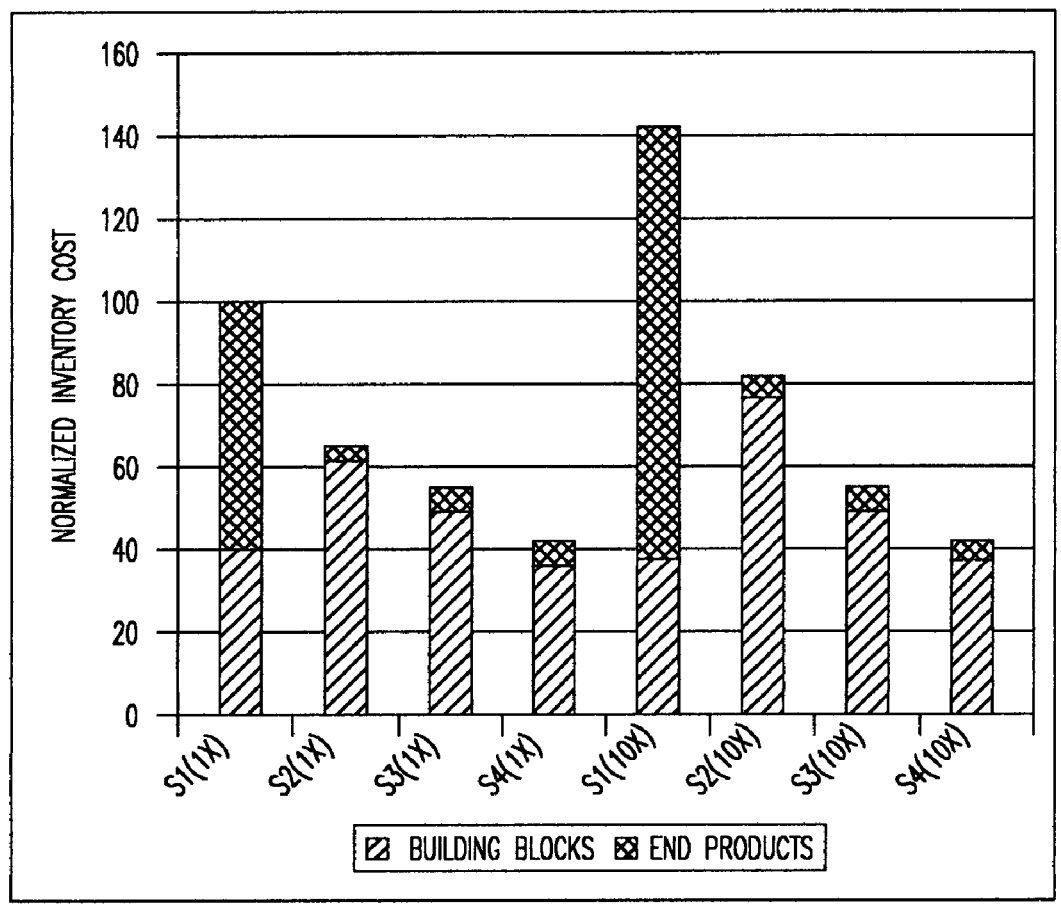
FIG. 7 is a graph showing the effect of product variety on inventory.

Our study of the third factor aims at analyzing the impact on inventory when the system supports a richer product set, in terms of product variety. The motivation is to support mass customization. In the Internet-based, direct-sales environment, for instance, the number of different product configurations that customers want to order can be significantly larger than what is currently supported in the build-to-stock environment. FIG. 7 shows the inventory costs: the four columns on the left correspond to the current product set (1×), with the first scenario (S1) being the "as-is" model, and the other three being the "to-be" model at the current (S2) and improved (S3, S4) forecast accuracy levels, respectively; the four columns on the right repeat these scenarios with a product set that is ten times as large in variety (10x), while maintaining the overall volume. (Also refer to Table 12 for a summary of all the different scenarios.)

Observe that as the product variety increases, a significantly higher level of inventory is required in the "as-is" model. This is because forecast accuracy will deteriorate when the end products proliferate (i.e., larger varieties at smaller volumes). On the other hand, in the "to-be" environment, the increase in inventory cost is very modest. This is because the proliferation of end-products will have minimal effect on the forecast accuracy at the building-block level, due to parts commonality. This strongly supports the fact that the building-block model is the right process to support an internet-based, direct-sales operation.

TABLE 12

Summary of the Scenarios Used to Study the Effect of Product Variety

| Scenario | Description | 1× Cases | 10× Cases |
|---|---|---|---|
| S1 | "as-is" | original product set, 30% forecast error, 90% service | ten times larger product set, 30% × $\sqrt{10}$ forecast error at MTM level |
| S2 | "to-be" | forecast at MTM level, 30% forecast error, 90% service | ten times larger product set, forecast error as in S2(1×) |
| S3 | "to-be" | forecast at BB level, 20% forecast error, 90% service | ten times larger product set, forecast error as in S3(1×) |
| S4 | "to-be" | forecast at BB level, 10% forecast error, 90% service | ten times larger product set, forecast error as in S4(1×) |

The examples given demonstrate the advantages of the invention applied to the business of manufacturing personal computers (PCs). However, the invention has applications to other configure-to-order (CTO) manufacturing systems and is not limited to manufacturing PCs. Thus, while the invention has been described in terms of a single preferred embodiment, those skilled in the art will recognize that the invention can be practiced with modification within the spirit and scope of the appended claims.

What is claimed is:

1. A computer implemented process of managing manufacturing logistics of configure-to-order end products comprising the steps of:

a) initializing a process of managing manufacturing logistics of configure-to-order end products by setting $x_i:=0$ for each $i \in S$, setting $r_{mi}:= P(X_{mi}>0)$, setting $\beta_m:=0$ for each $m \in M$, and setting $\beta:=0$, where $S$ is a set of components indexed by i, $M$ is a set of end products indexed by m, $x_i$ is a probability of no-stockout of a component of index i, $r_{mi}$ is a probability that a positive number of units of component i is used in the assembly of an end product indexed by m, $\beta_m$ is a probability of stockout of an end product of index m, and $\beta$ is an upper limit on the stockout probability over all end products;

b) setting a set of active components to $A:=\{ \}$;

c) considering each $i \in S$, followed by considering each end product m that uses component i in its bill-of-material;

d) setting $\beta_m:=\beta_m+r_{mi}\Delta$, for all m such that $i \in S_m$ where $\Delta$ is a unit step size;

e) computing the a difference $\delta_i:=\max_m\{\beta_m\}-\beta$;

f) determining if $\delta_i \leq 0$, and if so, then adding component index i to the set of active components, $A:=A+\{i\}$;

g) determining if the set of active components is non-empty, and if so, then setting $B:=A$, otherwise setting $B:=S$ where $B$ is a set of component indexes;

h) finding $i^*:=\arg \max_{i \in B}\{-c_i\sigma_i/r_{mi}g'(x_i+\Delta/2)\}$, where $-g'(\bullet)$ follows the equation $$-g'(x) = -\Phi(\Phi^{-1}(x)) \cdot \frac{-1}{\phi(\Phi^{-1}(x))} = \frac{1-x}{\phi(\Phi^{-1}(x))},$$

where $\Phi(.)$ is a probability distribution function of the standard normal variate, and $\phi(.)$ is a probability density function of the standard normal variate;

i) setting $x_i^*:=x_i^*+\Delta$ to update the probability of no-stockout of component $i^*$;

j) computing $\beta:=\max_{m \in M}\beta_m$, and checking whether inequality $$\sum_{i \in S} c_i \sigma_i g(x_i) \leq \beta,$$

where B is the budget limit on the expected overall inventory cost, is satisfied and if so, stop and replenish components identified by said set B from suppliers following a base-stock policy that minimizes a total cost of inventory of said components i, wherein said cost $c_i$ of at least one component differs from said cost $c_i$ of at least one other component;

k) otherwise, updating $\beta_m$ and for each $m \in M_{i^*}$, set $\beta_m:=\beta_m+r_{mi}\Delta$, and going to step b).

2. A method that translates end-product demand forecast in an assemble-to-order (ATO) environment into a forecast for components, taking into account outbound leadtime comprising the steps of:

defining in an assemble-to-order (ATO) environment an end product demand $D_m(t)$ of type m in period t, each unit of type m demand requiring a subset of components, denoted $S_m \subseteq S$, as $$D_i(t) = \sum_{m \in M_i} D_m(t + L_m^{out}); \text{ [and]}$$

deriving mean and variance for component demand $D_i(t)$ as $$E[D_i(t)] = \sum_{m \in M_i} \sum_l E[D_m(t+l)]P[L_m^{out} = l], \text{ and}$$

$$Var[D_i(t)] = \sum_{m \in M_i} \sum_l E[D_m^2(t+l)]P[L_m^{out} = l] -$$

$$\sum_{m \in M_i} \left(\sum_l E[D_m(t+l)]P[L_m^{out} = l]\right)^2, \text{ respectively; and}$$

replenishing said components from suppliers following a base stock policy that minimizes a total cost of inventory of said components, each said component having a cost, wherein said cost of at least one component differs from said cost of at least one other component, and wherein said difference determines the result of said replenishing step.

3. The method recited in claim 2, wherein the ATO environment is extended to a configure-to-order (CTO) environment for stationary demand, taking into account batch sizes comprising the steps of:

translating end-product demand into demand for each component i (per period) as $$D_i = \sum_{m \in M_i} \sum_{k=1}^{D_m} X_{mi}(k).$$

where $X_{mi}(k)$, for $k=1, 2, \ldots$, are independent, identically distributed (i.i.d.) copies of $X_{mi}$;

deriving marginal distributions, and then the mean and the variance of $X_{mi}$ as $$E[D_i] = \sum_{m \in M_i} E[X_{mi}]E[D_m], \text{ and}$$

$$Var[D_i] = \sum_{m \in M_i} (E[D_m]Var[X_{mi}] + Var[D_m]E^2[X_{mi}])$$

$$= \sum_{m \in M_i} (E^2[X_{mi}]E[D_m^2] + Var[X_{mi}]E[D_m] -$$

$$E^2[X_{mi}]E^2[D_m]),$$

respectively.

4. The method recited in claim 3, extended to non-stationary demand, wherein the mean and the variance of $X_{mi}$ are generalized as $$E[D_i(t)] = \sum_{m \in M_i} E[X_{mi}] \sum_l E[D_m(t+l)]P[L_m^{out} = l], \text{ and}$$

$$Var[D_i(t)] = \sum_{m \in M_i} E^2(X_{mi}) \sum_l E[D_m^2(t+l)]P[L_m^{out} = l] +$$

$$\sum_{m \in M_i} Var(X_{mi}) \sum_l E[D_m(t+l)]P[L_m^{out} = l] -$$

-continued $$\sum_{m \in M_i} E^2(X_{mi}) \left(\sum_l E[D_m(t+l)]P[L_m^{out} = l]\right)^2, \text{ respectively.}$$

5. The method recited in claim 3, further comprising the steps of:

defining $R_i(t)$ as a reorder point (or, base-stock level) in period t as $$R_i(t) := \mu_i(t) + k_i(t)\sigma_i(t),$$

where $k_i(t)$ is a desired safety factor, while $\mu_i(t)$ and $\sigma_i(t)$ can be derived (via queuing analysis) as $$\mu_i(t) = \sum_{s=t}^{t+l_i^{in}-1} E[D_i(s)], \text{ and}$$

$$\sigma_i^2(t) = \sum_{s=t}^{t+l_i^{in}-1} Var[D_i(s)], \text{ respectively,}$$

where $$l_i^{in} := E[L_i^{in}]$$

is expected in-bound leadtime; and translating $R_i(t)$ into "days of supply" (DOS), where the $\mu_i(t)$ part of $R_i(t)$ translates into periods of demand and the $k_i(t)\sigma_i(t)$ part of $R_i(t)$ is turned into $$\frac{k_i(t)\sigma_i(t)}{\frac{\mu_i(t)}{l_i^{in}}}$$

periods of demand so that $R_i(t)$ is expressed in terms of periods of DOS as $$DOS_i(t) = l_i^{in}\left[1 + k_i(t)\frac{\sigma_i(t)}{\mu_i(t)}\right].$$

6. The method recited in claim 5, wherein demand is stationary in which for each demand class m, $D_m(t)$ is invariant in distribution over time, so that the mean and the variance of demand per period for each component i reduce to $$\mu_i = l_i^{in}E[D_i], \text{ and } \sigma_i^2 = l_i^{in}Var[D_i], \text{ respectively, and}$$

$$R_i = l_i^{in}E[D_i] = k_i\sqrt{l_i^{in}} \, sd[D_i], \text{ and hence,}$$

$$DOS_i = \frac{R_i}{E[D_i]} = l_i^{in} + k_i\theta_i\sqrt{l_i^{in}} = l_i^{in}\left[1 + k_i\frac{\theta_i}{\sqrt{l_i^{in}}}\right],$$

where $\theta_i := sd[D_i]/E[D_i]$ is the coefficient of variation of the demand per period for component i, and hence $$\theta_i / \sqrt{l_i^{in}}$$

is the coefficient of variation of the demand over the leadtime $l_i^{in}$.

7. A method that relates service requirements to base-stock levels of components in an assemble-to-order (ATO) environment comprising the steps of:
defining in an assemble-to-order (ATO) environment each order of type m as requiring exactly one unit of component $i \in S_m$, $\alpha$ as a required service level, referred to as off-shelf availability of all the components required to configure a unit of type m product, for any m, and $E_i$ as an event that component i is out of stock;
determining a probability P for each end product $m \in M$, $$P[\subset_{i \in S_m} E_i] \leq 1 - \alpha, \text{ and}$$

$$P\left[\bigcup_{i \in S_m} E_i\right] = \sum_i P(E_i) - \sum_{i<j} P(E_i \cap E_j) + \sum_{i<j<k} P(E_i \cap E_j \cap E_k) - \ldots,$$

$$\text{and } P[\bigcup_{i \in S_m}] \cong \sum_{i \in S_m} P(E_i) = \sum_{i \in S_m} \Phi(k_i) \leq 1 - \alpha; \text{ and}$$

establishing base stock levels for each component i that minimize a total cost of inventory of said components, each said component having a cost,
wherein said cost of at least one component differs from said cost of at least one other component, and wherein said difference determines the result of said step of establishing base stock levels.

8. The method recited in 7, wherein the method is extended to a configure-to-order (CTO) environment taking into account batch sizes, further comprising the steps of:
defining $A \subseteq S_m$ as a certain configuration, which occurs in a demand stream with probability $P(A)$;
weighting a no-stockout probability, $\Pi_{i \in A} \Phi(k_i)$, by $P(A)$;
changing the service requirement to $$\alpha \leq \sum_{A \subseteq S_m} P(A) \prod_{i \in A} \Phi(k_i)$$

$$\approx \sum_{A \subseteq S_m} P(A) \left[1 - \sum_{i \in A} \Phi(k_i)\right]$$

$$= 1 - \sum_{A \subseteq S_m} P(A) \sum_{i \in A} \Phi(k_i)$$

$$= 1 - \sum_{i \in S_m} \left(\sum_{i \in A} P(A)\right) \Phi(k_i); \text{ and}$$

extending the CTO environment the service requirement to $$\sum_{i \in S_m} r_{mi} \Phi(k_i) \leq 1 - \alpha$$

where $r_{mi}$ is the probability that a positive number of units of component i is used in the assembly of an end product indexed by m.

9. A method that translates service requirements in terms of leadtimes into requirements for off-shelf availability of components comprising the steps of:
relating an off-shelf availability requirement to standard customer service requirements expressed in terms of leadtimes, $W_m$, where a required service level of type m demand is $$P[W_m \leq w_m] \geq \alpha, m \in M$$

where $w_m$'s are given data and P is probability;
when there is no stockout at any store $i \in S_m$, denoting the associated probability as $\pi_{0m}(t)$, a delay being $L_i^{out}$, the out-bound leadtime;
when there is a stockout at one or several stores in the subset $s \subseteq S_m$, denoting the associated probability as $\pi_{S_m}(t)$, so that the delay becomes $L_i^{out} + \tau_s$, where $\tau_s$ is the additional delay before the missing components in s become available;
determining $$P[W_m \leq w_m] = \pi_{0m}(t) P[L_m^{out} \leq w_m] + \sum_{s \in S_m} \pi_{sm}(t) P[L_m^{out} + \tau_s \leq w_m];$$

assuming that $$L_m^{out} \leq w_m \text{ and } L_m^{out} + \tau_s > w_m$$

both hold almost surely, so that when the (nominal) out-bound leadtime is nearly deterministic and shorter than what customers require, whereas the replenish leadtime for any component is substantially longer; and
replenishing said components from suppliers following a base stock policy that minimizes a total cost of inventory of said components, each said component having a cost,
wherein said cost of at least one component differs from said cost of at least one other component, and wherein said difference determines the result of said replenishing step.

* * * * *